US009899154B2

(12) United States Patent
Frank

(10) Patent No.: US 9,899,154 B2
(45) Date of Patent: *Feb. 20, 2018

(54) DENSE ENERGY ULTRA-CAPACITOR PREFORM, THIN FILM, MODULE AND FABRICATION METHODS THEREFOR

(71) Applicant: David Loron Frank, Highland Beach, FL (US)

(72) Inventor: David Loron Frank, Highland Beach, FL (US)

(73) Assignee: BLUE HORIZON INNOVATIONS, LLC., Coconut Creek, FL (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/903,040

(22) PCT Filed: Jun. 20, 2014

(86) PCT No.: PCT/US2014/043416
§ 371 (c)(1),
(2) Date: Jan. 5, 2016

(87) PCT Pub. No.: WO2015/006030
PCT Pub. Date: Jan. 15, 2015

(65) Prior Publication Data
US 2016/0155576 A1    Jun. 2, 2016

Related U.S. Application Data

(60) Provisional application No. 61/957,517, filed on Jul. 6, 2013, provisional application No. 61/958,169, filed
(Continued)

(51) Int. Cl.
*H01G 11/24* (2013.01)
*H01G 11/12* (2013.01)
(Continued)

(52) U.S. Cl.
CPC ............. *H01G 11/24* (2013.01); *H01G 11/12* (2013.01); *H01G 11/30* (2013.01); *H01G 11/84* (2013.01); *H01G 11/86* (2013.01); *Y02E 60/13* (2013.01)

(58) Field of Classification Search
CPC ........ H01G 11/24; H01G 11/86; H01G 11/30; H01G 11/84; H01G 11/12
See application file for complete search history.

(56) References Cited

U.S. PATENT DOCUMENTS 9,543,080 B1 *  1/2017  Frank ................... H01G 11/86
2003/0026063 A1   2/2003  Munshi
(Continued)

FOREIGN PATENT DOCUMENTS

JP      2009038089      2/2009

OTHER PUBLICATIONS

International Preliminary Report on Patentability dated May 25, 2015, received for International Application No. PCT/US14/43416.
(Continued)

*Primary Examiner* — David M Sinclair
(74) *Attorney, Agent, or Firm* — Jose Gutman; Fleit Gibbons Gutman Bongini & Bianco P.L.

(57) ABSTRACT

A Dense Energy Ultracapacitor DEUC preform, thin film, and module and methods of fabrication therefor, are provided. The DEUC thin film includes: a multilayer polymer thin film (2210) including a plurality of matched polymer layers (2215) having DEUC structural features resulting from drawing, by a draw process, and/or stretching, of a multilayer polymer DEUC preform (2201) having size, shape, and an arrangement of matched polymer layers (2205), where the multilayer polymer thin film (2210) having DEUC structural features in at least one dimension proportionally reduced in comparison to the same features in
(Continued)

the Preform (2201). The multilayer polymer thin film includes negative and positive electrodes (903) made from conducting polymer and spaced apart by suspended particle high dielectric energy storage media (904) including high dielectric nano and/or micro sized particles (901, 902) suspended in a binder (904) including at least one of a polymer, a copolymer, and a terpolymer. All the layers (903, 904) are bound and unified together.

17 Claims, 24 Drawing Sheets

Related U.S. Application Data on Jul. 22, 2013, provisional application No. 61/958,330, filed on Jul. 25, 2013, provisional application No. 61/862,210, filed on Aug. 5, 2013, provisional application No. 61/863,032, filed on Aug. 7, 2013, provisional application No. 61/863,042, filed on Aug. 7, 2013, provisional application No. 61/875,076, filed on Sep. 8, 2013, provisional application No. 61/893,832, filed on Oct. 21, 2013, provisional application No. 61/910,921, filed on Dec. 2, 2013, provisional application No. 61/931,754, filed on Jan. 27, 2014, provisional application No. 61/983,407, filed on Apr. 23, 2014.

(51) Int. Cl.
*H01G 11/84* (2013.01)
*H01G 11/30* (2013.01)
*H01G 11/86* (2013.01)

(56) References Cited

U.S. PATENT DOCUMENTS

| | | | |
|---|---|---|---|
| 2012/0177934 A1* | 7/2012 | Vogel | H01L 41/29 428/457 |
| 2013/0078510 A1* | 3/2013 | Reynolds | B82Y 30/00 429/209 |
| 2014/0160623 A1* | 6/2014 | Baer | B29C 47/0021 361/301.4 |

OTHER PUBLICATIONS

International Search Report dated Oct. 10, 2014, received for International Application No. PCT/US14/43416.

* cited by examiner

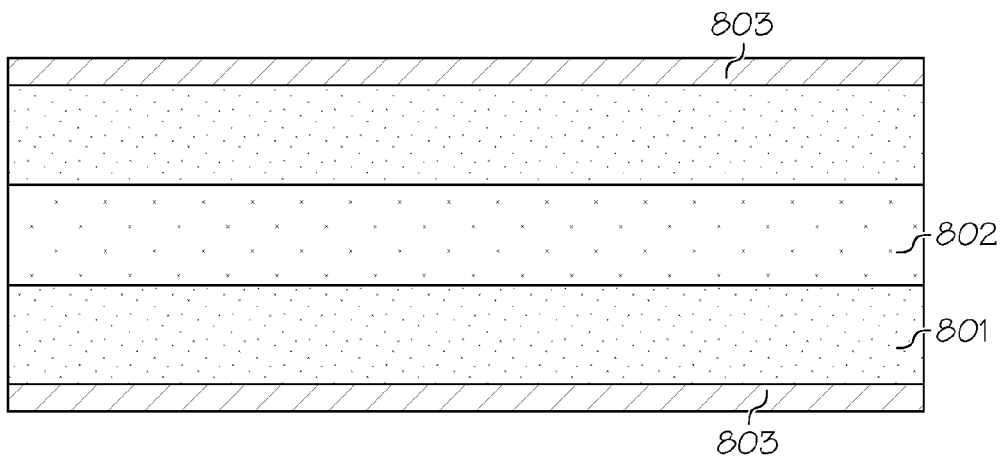
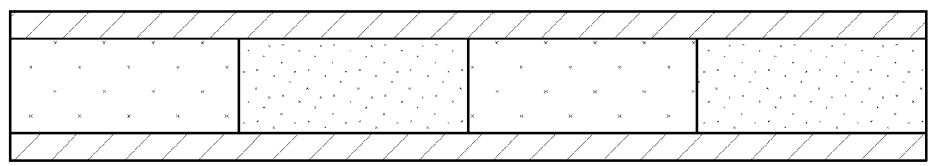
FIG. 11

| ELEMENTS | NOMINAL% | EDAX% | DEVIATION |
|---|---|---|---|
| Ca | 5 | 4.21 | -0.79 |
| Cu | 15 | 12.12 | -2.88 |
| Ti | 20 | 15.15 | -4.85 |
| O2 | 60 | 68.51 | 8.51 |

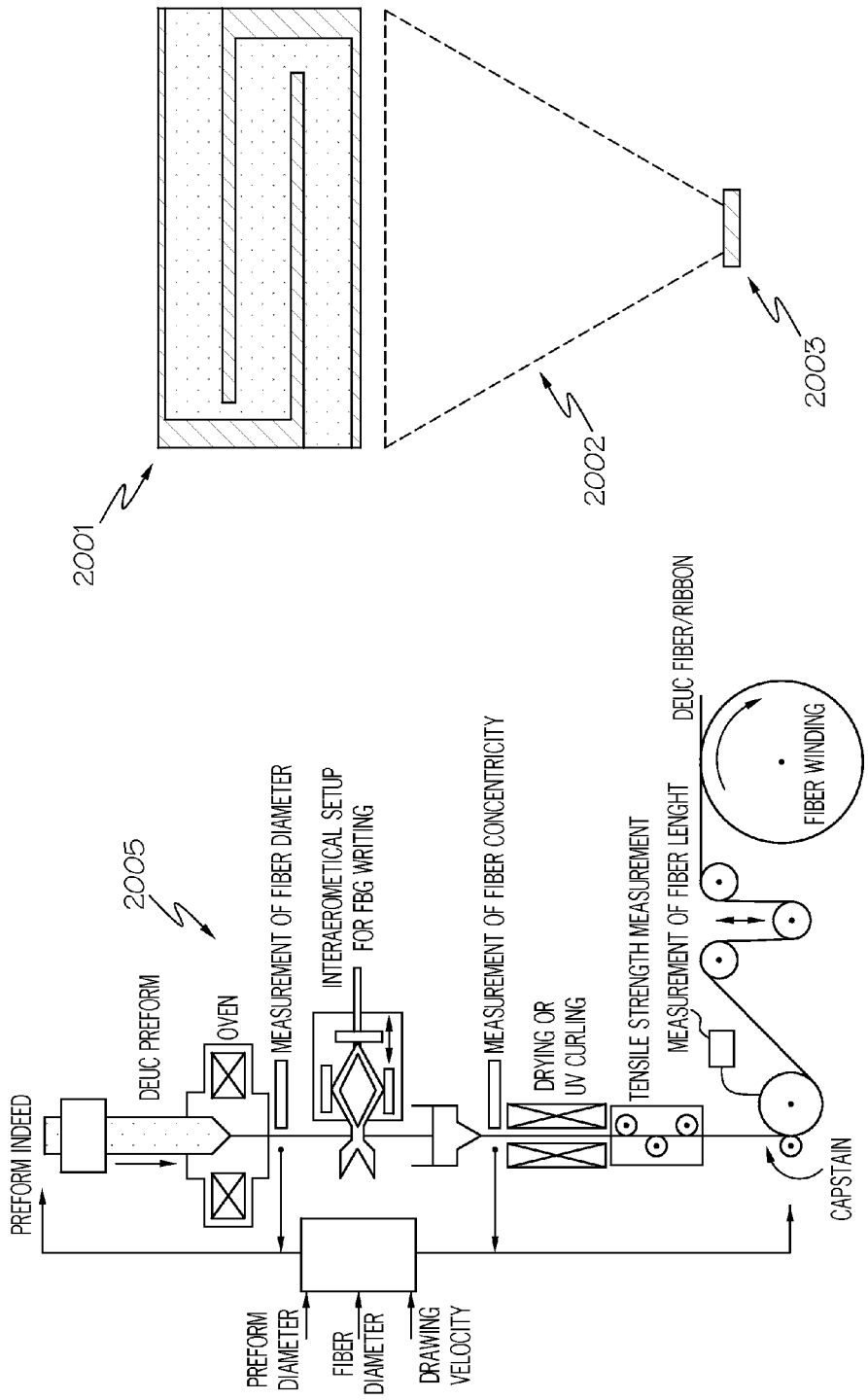

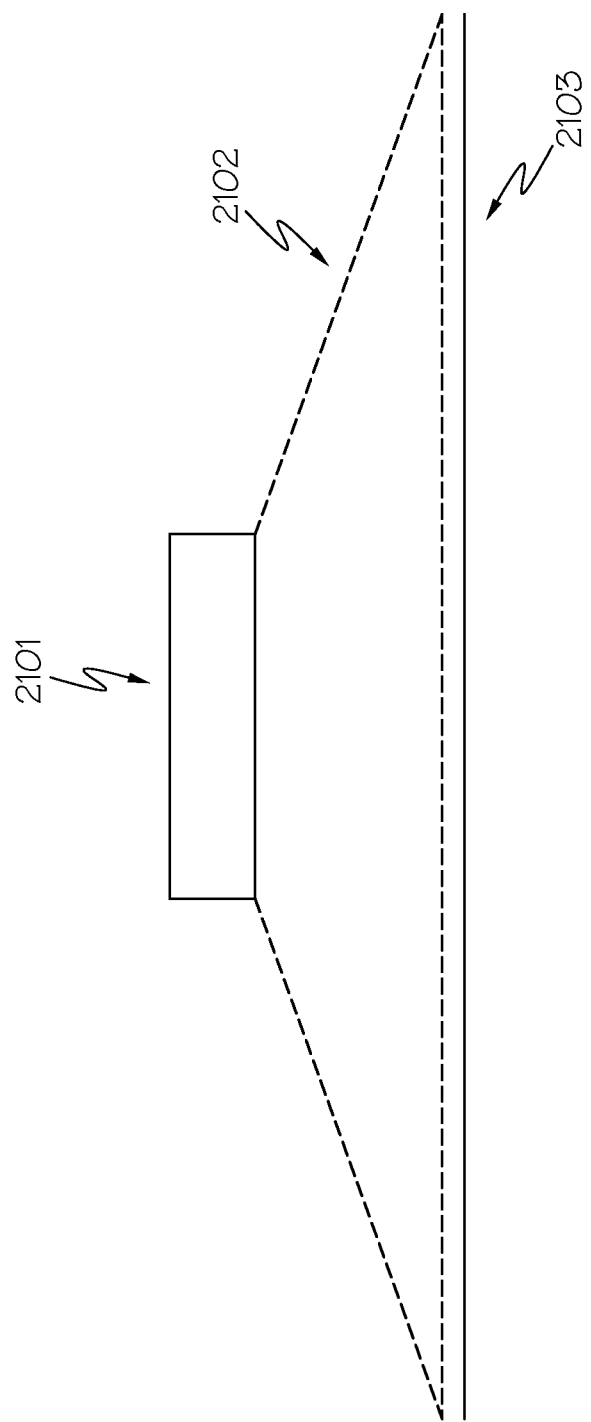

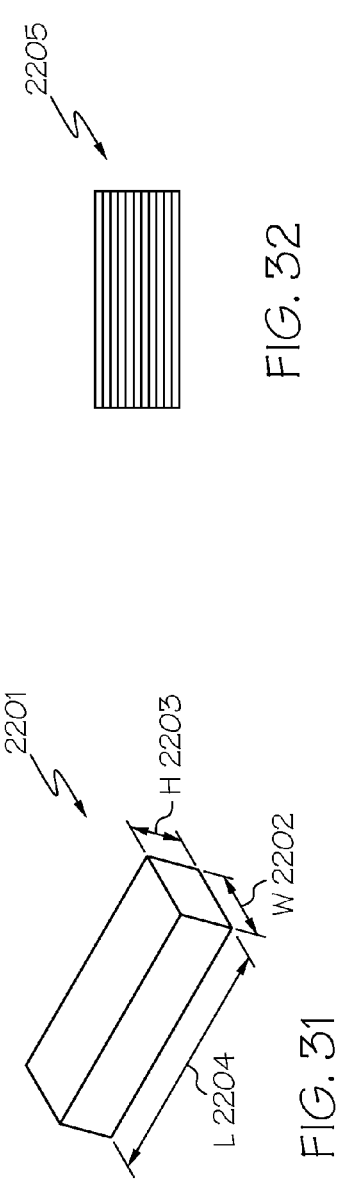
FIG. 31
FIG. 32
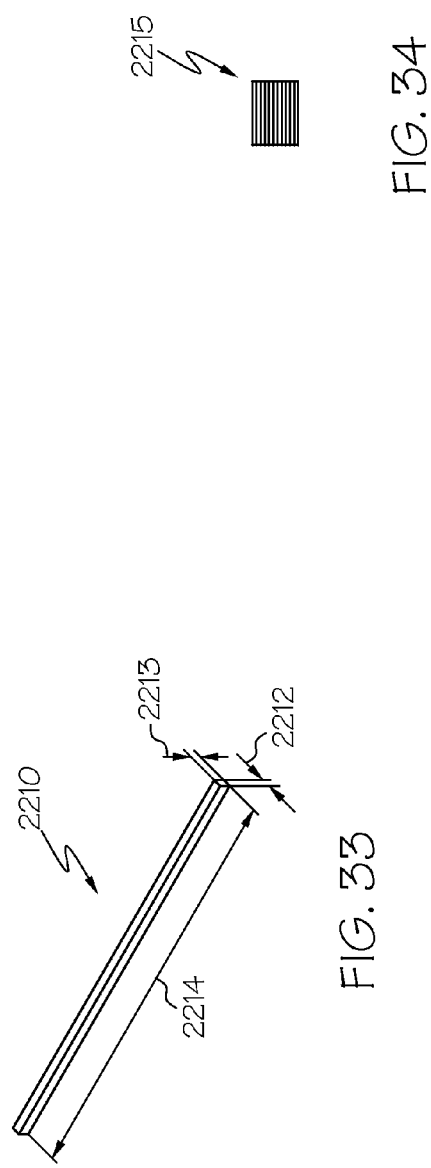
FIG. 33
FIG. 34

DENSE ENERGY ULTRA-CAPACITOR PREFORM, THIN FILM, MODULE AND FABRICATION METHODS THEREFOR

CROSS-REFERENCE TO RELATED APPLICATIONS

This application is based upon and claims priority to PCT Patent Application PCT/US2014/43416 filed on Jun. 20, 2014, which is based upon and claims priority to U.S. Patent Application Ser. No. 61/957,517 filed on Jul. 6, 2013, the disclosure of which is hereby incorporated by reference in its entirety. PCT Patent Application PCT/US2014/43416 is also based upon and claims priority to U.S. Patent Application Ser. No. 61/958,169 filed on Jul. 22, 2013, the disclosure of which is hereby incorporated by reference in its entirety. PCT Patent Application PCT/US2014/43416 is also based upon and claims priority to U.S. Patent Application Ser. No. 61/958,330 filed on Jul. 25, 2013, the disclosure of which is hereby incorporated by reference in its entirety. PCT Patent Application PCT/US2014/43416 is also based upon and claims priority to U.S. Patent Application Ser. No. 61/862,210 filed on Aug. 5, 2013, the disclosure of which is hereby incorporated by reference in its entirety. PCT Patent Application PCT/US2014/43416 is also based upon and claims priority to U.S. Patent Application Ser. No. 61/863,032 filed on Aug. 7, 2013, the disclosure of which is hereby incorporated by reference in its entirety. PCT Patent Application PCT/US2014/43416 is also based upon and claims priority to U.S. Patent Application Ser. No. 61/863,042 filed on Aug. 7, 2013, the disclosure of which is hereby incorporated by reference in its entirety. PCT Patent Application PCT/US2014/43416 is also based upon and claims priority to U.S. Patent Application Ser. No. 61/875,076 filed on Sep. 8, 2013, the disclosure of which is hereby incorporated by reference in its entirety. PCT Patent Application PCT/US2014/43416 is also based upon and claims priority to U.S. Patent Application Ser. No. 61/893,832 filed on Oct. 21, 2013, the disclosure of which is hereby incorporated by reference in its entirety. PCT Patent Application PCT/US2014/43416 is also based upon and claims priority to U.S. Patent Application Ser. No. 61/910,921 filed on Dec. 2, 2013, the disclosure of which is hereby incorporated by reference in its entirety. PCT Patent Application PCT/US2014/043416 is also based upon and claims priority to U.S. Patent Application Ser. No. 61/931,754 filed on Jan. 27, 2014, the disclosure of which is hereby incorporated by reference in its entirety. PCT Patent Application PCT/US2014/43416 is also based upon and claims priority to U.S. Patent Application Ser. No. 61/983,407 filed on Apr. 23, 2014, the disclosure of which is hereby incorporated by reference in its entirety.

BACKGROUND

The present disclosure generally relates to ultracapacitors, and more particularly to a hybrid ultracapacitor and dense energy power storage device and methods of fabrication therefor.

Current battery and rechargeable battery technologies do not lend themselves to a broad range of applications. Large and heavy batteries are applied to electric vehicles and contribute a significant portion of the weight of the vehicle to enable driving range. Miniature batteries have been developed in recent years to address miniature sensors and actuators such as biomedical devices and wireless communication systems. In the middle are requirements for portable electronic devices such as cellphones and computers. Chemical battery technologies are depleted in a short time, require frequent recharge, and have limited numbers of charge cycles before degradation of the battery charge capacity.

Other ultracapacitor technologies attempt to use other high dielectrics with Al2O3 insulator coating on the dielectric particle and ceramics as a final binder. This design provides a high potential for fracture cracks and separation in the ceramic binder and between the Al2O3 coating and in the ceramic media. In addition the calcium barium titanate has a limited permittivity that does not provide the energy storage capacity required for many applications.

Other technologies use micro fabrication methods to create nano and/or micron layers of high dielectric particles suspended in ceramic or polymer.

Some fabrication methods use a stretched thin film for a battery separator or apply electrodes to a stretched thin film via spray deposition.

The performance of the barium titanate ultracapacitors does not provide the enhanced energy storage needed to meet commercial demands. Current ultracapacitor designs using metallic electrodes do not retain cohesive interaction between the ultracapacitor components over time with electric load and/or temperature variation and may cause the system to deteriorate. Micro and nano fabrication methods are costly and time consuming to fabricate an ultracapacitor with comparable energy density of a lithium-ion battery.

Therefore a need exists to overcome the problems with the prior art as discussed above.

BRIEF SUMMARY

A hybrid ultracapacitor and dense energy power storage device and methods of production are described using nano and/or micro particle energy storage media with high performance suspension media and electrodes anodes and cathodes to enable rapid charge and dense energy storage in a scalable cell with efficient fabrication methods to support a wide variety of applications.

In one embodiment, a suspended particle Dense Energy Ultracapacitor DEUC preform for fabricating a DEUC module that provides rapid charge and energy storage, comprises: a multilayer polymer DEUC preform Preform having a size, a shape, and an arrangement of a plurality of matched polymer layers, with similar melt and heated flow characteristics, suitable for drawing by a draw process and/or stretching into a multilayer thin film having DEUC structural features in at least one dimension proportionally reduced in comparison to the same DEUC structural features in the Preform; and where one or more layers of the Preform comprise negative and positive electrodes made from conducting polymer and that are spaced apart by suspended particle high dielectric energy storage media; where one or more layers of the Preform comprise suspended particle high dielectric energy storage media; where the high dielectric energy storage media comprises high dielectric particles that are at least one of nano and/or micro sized particles suspended in a binder comprising at least one of a polymer, a copolymer, and a terpolymer, and where all of the Preform layers are bound together to form a unified Preform.

In another embodiment, a suspended particle Dense Energy Ultracapacitor DEUC thin film for fabricating a DEUC module that provides rapid charge and energy storage, comprises: a multilayer polymer thin film comprising a plurality of matched polymer layers having DEUC structural features resulting from drawing, by a draw process, of a multilayer polymer DEUC preform Preform having a size, a shape, and an arrangement of a plurality of matched polymer layers, the multilayer polymer thin film having DEUC structural features in at least one dimension proportionally reduced in comparison to the same DEUC structural features in the Preform; and where one or more layers of the multilayer polymer thin film comprise negative and positive electrodes made from conducting polymer and that are spaced apart by suspended particle high dielectric energy storage media; where one or more layers of the multilayer polymer thin film comprise suspended particle high dielectric energy storage media; where the high dielectric energy storage media comprises high dielectric particles that are at least one of nano and/or micro sized particles suspended in a binder comprising at least one of a polymer, a copolymer, and a terpolymer, and where all of the multilayer polymer thin film layers are bound and unified together.

In a third embodiment, a method of fabrication of a suspended particle Dense Energy Ultracapacitor DEUC module, comprises: receiving a multilayer polymer DEUC preform Preform having a size, a shape, and an arrangement of a plurality of matched polymer layers, suitable for drawing by a draw process and/or stretching into a multilayer polymer thin film, the Preform including DEUC structural features that are in at least one dimension proportionally larger in comparison to the same DEUC structural features in the multilayer polymer thin film, and where one or more layers of the Preform comprise negative and positive electrodes made from conducting polymer and that are spaced apart by suspended particle high dielectric energy storage media, and where one or more layers of the Preform comprise suspended particle high dielectric energy storage media, and where the high dielectric energy storage media comprises high dielectric particles that are at least one of nano and/or micro sized particles suspended in a binder comprising at least one of a polymer, a copolymer, and a terpolymer, and where all of the Preform layers are bound together to form a unified Preform; and drawing by a draw process the Preform into a multilayer polymer thin film including DEUC structural features in at least one dimension proportionally reduced in comparison to the same DEUC structural features in the Preform.

In a fourth embodiment, a suspended particle dense energy ultracapacitor DEUC that provides rapid charge and energy storage, comprises: a silicone, rubber or polymer sheet loaded with high dielectric particles formed through extrusion and/or spray deposition to form an energy storage media layer; where conductive material is applied on both sides of the energy storage media layer to form positive and negative conducting polymer electrode layers; where the positive conducting polymer electrode layers positive electrodes and the negative conducting polymer electrode layers negative electrodes are offset relative one another to separate them in a left/right orientation in a multilayer stack; and where the multilayer thin film is applied as at least one of: a layered DEUC; and rolled up to form a cylindrical DEUC module; and where the positive electrodes are interconnected to form the positive connector of the DEUC module and where the negative electrodes are interconnected to form the negative connector of the DEUC module.

In a fifth embodiment, a suspended particle dense energy ultracapacitor DEUC that provides rapid charge and energy storage, comprises: a multilayer DEUC thin film where one or more layers of the multilayers are negative and positive electrodes that are spaced apart by one or more layers of a high dielectric energy storage media; where the high dielectric energy storage media comprises high dielectric particles that are nano and/or micro sized and suspended in a polymer, ceramic, rubber, and/or silicone; where the positive electrodes form the positive connector of the DEUC, and where the negative electrodes form the negative connector of the DEUC.

In a sixth embodiment, a suspended particle Dense Energy Ultracapacitor DEUC module comprises: at least one suspended particle DEUC thin film as described above, and where one or more positive electrodes of the at least one suspended particle DEUC thin film form one or more respective positive connectors of the DEUC module; and where one or more negative electrodes of the at least one suspended particle DEUC thin film form one or more respective negative connectors of the DEUC module.

In a seventh embodiment, the sixth embodiment further comprises one or more layers of the multilayer polymer thin film spaced apart to form a cooling tunnel, and where heat within the suspended particle DEUC module is transferred into the cooling tunnel and moved to and released through a thermal coupler.

In an eight embodiment, at least one suspended particle DEUC modules is coupled with at least one of: one or more solar cells, one or more radioisotope power cells, a photovoltaic system, a thermalvoltaic system, a movement charge system, and a manual charge system, for providing electric charge to the DEUC module and electric energy storage by the DEUC module.

In various alternative embodiments, at least one suspended particle DEUC module is designed and fabricated to power at least one of micro devices, integrated circuits, electric vehicles, unmanned aerial vehicles, electronic cigarettes, mobile computing devices, laptops, tablets, mobile phones, wireless communication devices, mobile sensor systems.

In further various alternative embodiments, at least one suspended particle DEUC module is designed and fabricated for at least one of: electric power grid support and to provide uninterruptible power supplies.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 11 is a cross-sectional side view of an example of stratified layers of energy storage media, according to the present disclosure;

FIG. 28 is an illustration showing an example draw down fabrication process, according to the present disclosure;

FIG. 29 is an illustration showing an example a Dense Energy UltraCapacitor preform reduction to a ribbon multilayer thin film based on the draw down fabrication process shown in FIG. 28, according to the present disclosure;

FIG. 30 is an illustration showing an example Uniaxial/Biaxial stretch process for Dense Energy UltraCapacitor preform reduction to a ribbon multilayer thin film, according to the present disclosure;

FIG. 31 is an illustration showing an example Dense Energy UltraCapacitor preform for draw down reduction to a ribbon multilayer thin, according to the present disclosure;

FIG. 32 is a cross-sectional side view of the Dense Energy UltraCapacitor preform of FIG. 31;

FIG. 33 is an illustration showing an example Dense Energy UltraCapacitor ribbon multilayer thin film resulting from the preform of FIG. 31 after applying draw down reduction process, according to the present disclosure;

FIG. 34 is a cross-sectional side view of the example Dense Energy UltraCapacitor ribbon multilayer thin film of FIG. 33;

DETAILED DESCRIPTION

Figure 1:
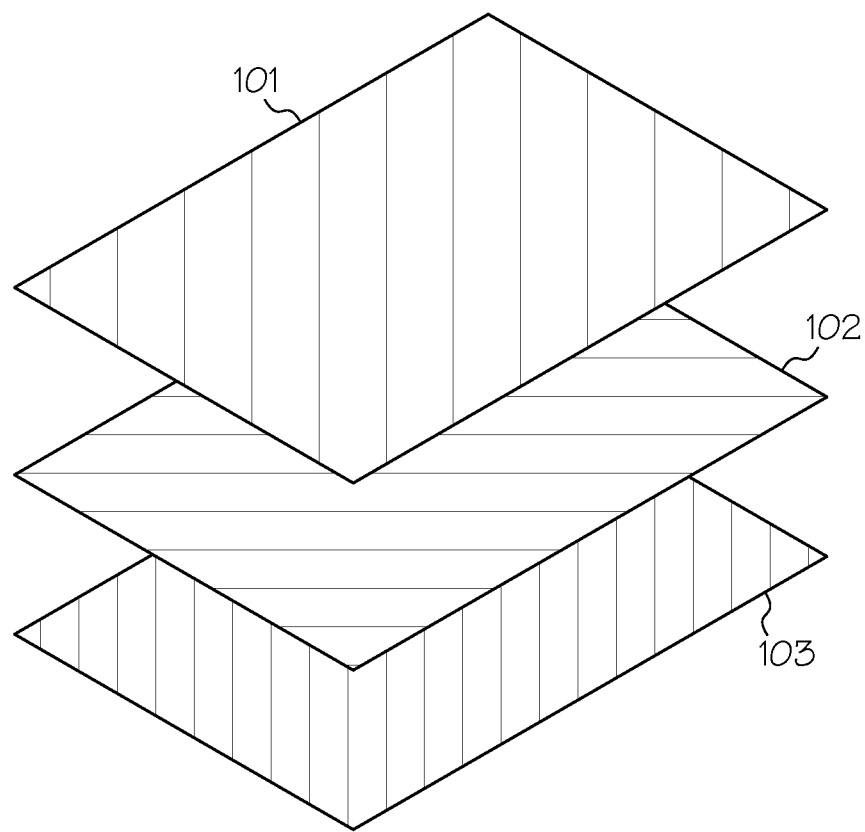
FIG. 1 is an illustration showing an example of Dense Energy UltraCapacitor Plates, according to the present disclosure.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The present disclosure provides, according to one embodiment, a hybrid ultacapacitor/deep cell battery technology and applies a high dielectric material in the form of nano and/or micro particles that are suspended in a polymer binder and positioned in between anode and cathode conductor elements. The inventor has named this new technology as Dense Energy UltraCapacitor DEUC technology, as will be further discussed below. The DEUC is fabricated using a multilayer polymer preform that is stretched and/or pulled in a uniaxial or biaxial direction, creating a multilayer thin film. The preform is essentially a larger DEUC module that is drawn, stretched, and/or pulled to change the structure of the PVDF based polymer used to suspend the dielectric particles and to cause all of the layers of the preform to become extremely thin. The resulting DEUC multilayer thin film can be rolled into a cylindrical shape or folded into various shapes and multi-sided topologies.

The multilayer preform can be stretched, for example, to create a reduced dimension thin film which solves the issue of scalability. The DEUC enables the fabrication of large area modules using a preform fabricated at a larger scale that can be drawn and/or stretched into thin films of a smaller scale. The use of micro fabrication techniques to create and combine components at the nano scale is typically impractical. Spray deposition to create the nano level components requires extensive curing cycles for each layer and is a complex process. The DEUC design solves the issue of efficient and cost effective fabrication of an ultracapacitor that provides high energy density, rapid charge times, and unlimited charge cycles.

The DEUC energy storage media can be based, for example, on nano-particles of a high dielectric material such as calcium copper titanate, $CaCu_3Ti_4O_{12}$ and La15/8Sr1/8NiO4 LSNO. Calcium copper titante CCTO and LSNO have extremely large effective dielectric constants of approximately 12,000 at room temperature and up to 160,000 under certain configurations. The particles may or may not have a protective coating before being suspended in a binder. If a protective coating is used, the particles could be fabricated as a core and shell design where the dielectric particle would be applied as the core and material compatible with the core and binder material is applied as the outer shell.

The particles are suspended in a high performance media that may be insulating or conducting called a "storage media". The storage media is positioned between the electrodes of the DEUC.

According to various embodiments, Titanium phenyl phosphate suspended in a polymer has been demonstrated to provide high energy density with low loss.

Flourene Polyester is offered as a suspension polymer for the dielectric micro and/or nano particles.

Standard CCTO or CCTO synthesized with a specific copper content and/or metallic doping can be suspended in a media with high electric breakdown characteristics to create a high density energy storage media. The storage medial can be fabricated as a thin film with high performance electrodes to create a high density ultracapacitor to be applied in a wide range of applications.

Pure CCTO bulk properties are optimized by reducing impurities and anomalies to improved performance in the Dense Energy Ultracapacitor. The inventor has created a proprietary CCTO utilizing a variations in copper content and/or doping with a metallic material called CCTO-X, as will be discussed in more detail below.

CaCu3Ti4O12 CCTO is an excellent dielectric material providing a high dielectric constant of approximately 12,000 at room temperature and shows temperature independence over the temperature range from approximately 100 to 400K. The CCTO ceramics exhibit an electrically heterogeneous structure involving mobile-charged species in terms of the Maxwell-Wagner relaxation. Internal interfaces in the polycrystalline CCTO give rise to the polarization in the insulating grain boundary and at the semiconducting grains which is well explained by the internal barrier layer capacitor model.

In one embodiment, the CCTO is prepared as at least one of a nano and a micro particle. In another embodiment, the inventor proposes the addition of nanocomposites to CCTO, a core shell design, doping of the CCTO particles or the combination of any or all methods. A core shell design can include, for example, a CCTO core with at least one of the following: an AL2O3 shell, a rubber shell, a synthetic rubber shell, a polymer shell, a ceramic shell, and a combination thereof.

According to the current disclosure it is proposed to use either standard CCTO or a proprietary formula CTTO-X base material that may be doped applied using a variety of metallic materials including but not limited to zinc, aluminum, silver and lanthanum.

An example of CCTO synthesis has been offered in the prior art where nanoparticles of CCTO were synthesized from a precursor route. A method of preparing the nano particles of CCTO with the crystallite size varying from 30 to 200 nm is optimized at a temperature as low as 680° C. from the exothermic thermal decomposition of an oxalate precursor CaCu3TiO4C2O48.9H2O. The phase singularity of the complex oxalate precursor was confirmed by the wet chemical analyses, X ray diffraction, FT-IR and TGA/DTA analyses. The nearly flattened tetrahedral geometry prevails for CuO4 in the near surface regions of the particles whereas square planar CuO4 groups are dominant in the interior regions of the nanoparticles. The powders derived from the oxalate precursor have excellent sinterability resulting in high density ceramics which exhibited giant dielectric constants up to 40000 1 kHz at 25° C. accompanied by low dielectric loss <0.07.

The CCTO particles are fabricated to a particle size of less than 200 nm. This small particle size does not need an insulator shell to assist in reducing dielectric loss. A shell may be applied to ensure the particles do not agglomerate and/or have a desired particle separation.

While the dielectric permittivity of the proprietary formula for CaCu3xTi4O12 calcium copper titanate oxide is impressively large between 10,000 to 1,000,000 at 100 Hz and is nearly constant over a wide frequency range between 100 Hz to −100 MHz. The inventor has found that the dielectric permittivity of CaCu3Ti4O12 composition changes with the amount of copper applied and with grain sizes.

In one embodiment of the present disclosure, it is provided a multi-mode CCTO-X particle sizes using the optimum particle size range in the micro sized CCTO-X and/or nano particle sized CCTO-X for dense packing.

In one embodiment, it is provided a multi-mode LSNO-X particle sizes using the optimum particle size range in the micro sized LNSO-X and/or nano particle sized LNSO-X for dense packing.

The use of different high dielectric particle sizes can be further applied as individual core/shell particles of different sizes or multilayer high dielectric/lower dielectric particles. This design applies the varying dielectric properties to create a hybrid performance. The different core/shell particle sizes and/or the multilayer with different particle sizes can be tuned to create the desired characteristics.

The different particle sizes may be mixed or applied in layers forming two or more strata between the electrodes or any combination of mixed particles and single size particles in the strata between the electrodes.

The energy storage layer, according an example embodiment, comprises micro and/or nano particles simple particles, doped particles, core shell particles, composite particles or a combination and is mixed in a binder with a specified thickness. Preferred thickness is less than one micron for nano particles and less than 10 microns for micro particles. The binder material, according to the example, may be a rubber, epoxy, polymer, or ceramic.

The preferred binder material is polyvinylidene difluoride PVDF or a blend of polyvinylidene difluoride and Chlorotrifluoroethylene CTFE.

Polyvinylidene fluoride or polyvinylidene difluoride PVDF is a highly non-reactive and pure thermoplastic flouropolymer that can be used as a suspension binder for the DEUC. PVDF is a specialty plastic material in the fluoropolymer family with an easier melt process because of its relatively low melting point of around 177° C. It can be injected, molded, or welded.

CTFE is a non reactive flouropoymer that can be used as a suspension binder for the DEUC. Copolymers and Terpolymers can be designed to optimize breakdown voltage and lock in the dielectric charge.

Biaxial and/or uniaxial stretching enhances the polyvinylidene difluoride PVDF and/or the copolymer Polypolyvinylidene difluoride-tetrafluoroethylene PVDF-TFE dielectric constant breakdown and energy storage properties, in addition to energy storage and breakdown properties.

Various fabrication methods are available to create the DEUC layers. One method for fabricating the energy storage layer comprises spray particle deposition. Another method of fabrication of the energy storage media is based on an extrusion of the core/shell particles suspended in an RTV, SBR, or polymer mix.

DEUC cells can be combined in a two or three dimensional configuration to further increase energy storage capacity. The three dimensional DEUC layers interconnect the multiple three dimensional DEUC layers to increase DEUC capacity.

To further increase performance, one or more of the anodes or cathodes can be designed as a lattice with dielectric particles interleaved in the electrode or cathode lattice to create increased surface interconnection between the anode and/or cathode with the energy storage media.

Temperature and/or electric voltage can affect the energy storage media causing contraction and/or swelling of the media. The storage media and the electrodes need to be compatible to ensure that the interconnection remains optimum between the two components.

The electrodes need to be flexible and move with the effects of the flexing of the storage media. Matching the characteristics of the polymer based energy storage layer with the conducting polymer electrode layer (i.e., matched polymer layers) is one means of maintaining a cohesive design. The electrode may comprise a metallic material, electrical conducting polymers, or a combination thereof. The preferred electrodes are made using an electrical conducting polymer to allow flexibility and to maintain a cohesive connection between the energy storage layer polymer and the electrodes.

According to another fabrication method, graphene is used as the electrode or as an interface between the energy storage media and the electrode.

In one embodiment of the disclosure, graphene material is proposed for the electrodes. Graphene is an allotrope of carbon. In graphene, carbon atoms are arranged in a regular hexagonal pattern. Graphene can be described as a one-atom thick layer of the mineral graphite. Multiple layers of graphene stacked together effectively form crystalline flake graphite.

Graphene differs from most conventional three-dimensional materials. Intrinsic graphene is a semi metal or zero-gap semiconductor. Experimental results from transport measurements show that graphene has remarkably high electron mobility at room temperature, with reported values in excess of 15,000 $cm^2$.

Grahpene can also be configured as a tube or elongated particle. A 2-D or 3-D array of the graphene elongated particles could interconnect with the storage media and allow flexing of the storage media across temperature changes and applied voltage. The graphene could be connected to a metallic or conducting material for the electrode and allow for interconnection of the anodes and cathodes to form a stack of ultracapacitor cells.

The extremely high surface area to mass ratio of graphene makes it an excellent candidate for the conductive plates electrodes, anodes and cathodes of the Dense Energy UltraCapacitor DEUC enabling greater energy storage density.

Electrical Conducting Polymers ECP provide a high performance electrode with matching thermal characteristics with the polymer binder of the energy storage media (i.e., matched polymer layers).

Polyaniline can be configured as a material with varying conductive and dielectric properties. Additives to the polyaniline can tune the dielectric constant and adjust the electrical conductivity to approach the performance of a metal conductor. One embodiment uses varying states of polyaniline to suspend the core/shell dielectric particles as a binder and increase conductivity at the electrode.

Polyanaline can be applied as a coating to black carbon particles and melted into a film with good distribution of the black carbon particles.

Polyanaline may be combined with conducting nano particles to increase conductivity.

Polyaniline can be applied in varying stages of electrical conductivity and dielectric properties to optimize the dense energy ultracapacitor.

Polyaniline has proven to uniformly adsorb on graphene preventing agglomeration of the graphene sheets. The Polyaniline/Graphene composite exhibits excellent electrochemical performance. Three-dimensional graphene structures can be formed using polyaniline/Graphene structures enabling high performance ultracapacitor electrodes.

Polyaniline can be configured to conduct across a wide range, from being utterly non-conductive for insulation use to highly conductive for other electrical purposes.

Another method for fabricating multiple layers of electrode and energy storage media is the use of ultrasonic nozzles that operate by converting high frequency sound waves into mechanical vibrations, which atomize liquids into mathematically defined micron sized droplets. These droplets have a very tight drop distribution, and their size is dictated by the frequency at which the nozzle operates.

Continuous vibrations of the nozzle disperse particles evenly in suspension during the coating process, creating homogeneous thin film layers of functional particles. 120 kHz and higher frequency nozzles have proven most successful. These higher frequency nozzles produce the smallest droplet sizes with effective deagglomeration of particles. This process is one method for a graphene coating processes to create the electrodes on the energy storage media. The graphene electrodes may be applied to the storage media preform prior to curing or to the cured storage media.

The DEUC may be integrated with photovoltaic or thermovoltaic systems to form an integrated energy generator and energy storage device.

While the particle size has a huge impact on the dielectric properties of CTTO-X and LNSO-X, the composition of the suspension media is equally as important.

The use of PVFD and/or the polymer blend of polyvinylidene difluoride-Chlorotrifluoroethylene PVFD-CTFE or a ceramic as a shell for a dielectric particle promotes better dispersion of the filler in the same or similar storage media and provides higher effective dielectric constants of the composites. The compatible shell/binder promotes stability and specific surface area of the media-filler interface minimizing defects or voids in the composite and increasing the breakdown strength and overall energy density. The introduction of metallic nano particles into the filler and/or the use of a conducting filler increases overall performance and energy storage.

The present disclosure provides a hybrid ultacapacitor/deep cell battery technology and applies a high dielectric material in the form of nano and/or micro particles that are suspended in a polymer binder and positioned in between the anode and cathode elements. The technology is called the Dense Energy UltraCapacitor DEUC. The DEUC is fabricated using a multilayer polymer preform that is stretched and/or pulled in a uniaxial or biaxial direction, creating a multilayer thin film. The preform is essentially a larger DEUC module that is stretched or pulled to change the structure of the PVDF based polymer used to suspend the dielectric particles and to cause all of the layers of the preform to become extremely thin. The resulting DEUC multilayer thin film can be rolled into a cylindrical shape or folded into various shapes.

The multilayer preform and stretching of the preform to create the thin film solves the issue of scalability. The DEUC enables the fabrication of large area modules using a preform fabricated at a larger scale that is stretched into thin films of a smaller scale. The use of micro fabrication techniques to create and combine components at the nano scale is impractical. Spray deposition to create the nano level components requires extensive curing cycles for each layer and is a complex process. The DEUC design solves the issue of efficient and cost effective fabrication of an ultracapacitor that provides high energy density, rapid charge times and unlimited charge cycles.

The DEUC energy storage media is based on nanoparticles of a high dielectric material such as calcium copper titanate, $CaCu_3Ti_4O_{12}$ and La15/8Sr1/8NiO4 LSNO. Calcium copper titanate CCTO and LSNO have extremely large effective dielectric constants of approximately 12,000 at room temperature and up to 160,000 under certain configurations. The particles may or may not have a protective coating before being suspended in a binder. If a protective coating is used, the particles could be fabricated as a core and shell design where the dielectric particle would be applied as the core and material compatible with the core and binder material is applied as the outer shell.

The particles are suspended in a high performance media that may be insulating or conducting called a "storage media". The storage media is positioned between the electrodes of the DEUC.

Standard CCTO or CCTO synthesized with a specific copper content and/or metallic doping can be suspended in a media with high electric breakdown characteristics to create a high density energy storage media. The storage medial can be fabricated as a thin film with high performance electrodes to create a high density ultracapacitor to be applied in a wide range of applications.

Pure CCTO bulk properties are optimized by reducing impurities and anomalies to improved performance in the Dense Energy Ultracapacitor. The inventor has created a proprietary CCTO utilizing a variations in copper content and/or doping with a metallic material called CCTO-X.

CaCu3Ti4O12 CCTO which is an excellent dielectric material providing a high dielectric constant of approximately 12,000 at room temperature and shows temperature independence over the temperature range from approximately 100 to 400K. The CCTO ceramics exhibit an electrically heterogeneous structure involving mobile-charged species in terms of the Maxwell-Wagner relaxation. Internal interfaces in the polycrystalline CCTO give rise to the polarization in the insulating grain boundary and at the semiconducting grains which is well explained by the internal barrier layer capacitor model.

In one embodiment, the CCTO is prepared as a nano or micro particle. In another embodiment, it is proposed the addition of nanocomposites to CCTO, a core shell design, doping of the CCTO particles or the combination of any or all methods. According to one example, a core shell design includes a CCTO core with an AL2O3 shell, rubber shell, synthetic rubber shell, a polymer shell or a ceramic shell.

The current disclosure proposes use of, for example, either standard CCTO or a proprietary formula CTTO-X base material that may be doped applied using a variety of metallic materials including but not limited to zinc, aluminum, silver and lanthanum.

An example of CCTO synthesis has been offered in the prior art where nano particles of CCTO were synthesized from a precursor route. A method of preparing the nano particles of CCTO with the crystallite size varying from 30 to 200 nm is optimized at a temperature as low as 680° C. from the exothermic thermal decomposition of an oxalate precursor $CaCu_3TiO_4C_2O_4 8.9H_2O$. The phase singularity of the complex oxalate precursor was confirmed by the wet chemical analyses, X ray diffraction, FT-IR and TGA/DTA analyses. The nearly flattened tetrahedral geometry prevails for $CuO_4$ in the near surface regions of the particles whereas square planar $CuO_4$ groups are dominant in the interior regions of the nanoparticles. The powders derived from the oxalate precursor have excellent sinterability resulting in high density ceramics which exhibited giant dielectric constants up to 40000 1 kHz at 25° C. accompanied by low dielectric loss <0.07.

The CCTO particles are fabricated to a particle size of less than 200 nm. This small particle size does not need an insulator shell to assist in reducing dielectric loss. A shell may be applied to ensure the particles do not agglomerate and/or have a desired particle separation.

While the dielectric permittivity of our proprietary formula for $CaCu_3xTi_4O_12$ calcium copper titanate oxide is impressively large between 10,000 to 1,000,000 at 100 Hz and is nearly constant over a wide frequency range between 100 Hz to −100 MHz. The inventor has found that the dielectric permittivity of $CaCu_3Ti_4O_12$ composition changes with the amount of copper applied and with grain sizes.

In one embodiment, it is provided a multi-mode CCTO-X particle sizes using the optimum particle size range in the micro sized CCTO-X and/or nano particle sized CCTO-X for dense packing.

In one embodiment, it is provided a multi-mode LSNO-X particle sizes using the optimum particle size range in the micro sized LNSO-X nd or nano particle sized LNSO-X for dense packing.

The use of different high dielectric particle sizes can be further applied as individual core/shell particles of different sizes or multilayer high dielectric/lower dielectric particles. This design applies the varying dielectric properties to create a hybrid performance. The different core/shell particle sizes and/or the multilayer with different particle sizes can be tuned to create the desired characteristics.

The different particle sizes may be mixed or applied in layers forming two or more strata between the electrodes or any combination of mixed particles and single size particles in the strata between the electrodes.

The energy storage layer is comprised of micro and/or nano particles simple particles, doped particles, core shell particles, composite particles or a combination and is mixed in a binder with a specified thickness. Preferred thickness is less than one micron for nano particles and less than 10 microns for micro particles. The binder material may comprise a rubber, epoxy, polymer, ceramic, or a combination thereof.

The preferred binder material is polyvinylidene difluoride PVDF or a blend of polyvinylidene difluoride and Chlorotrifluoroethylene CTFE.

Polyvinylidene fluoride, or polyvinylidene difluoride PVDF is a highly non-reactive and pure thermoplastic flouropolymer that can be used as a suspension binder for the DEUC. PVDF is a specialty plastic material in the fluoropolymer family with an easier melt process because of its relatively low melting point of around 177° C. It can be injected, molded or welded.

CTFE is a non reactive flouropoymer that can be used as a suspension binder for the DEUC. Copolymers and Terpolymers can be designed to optimize breakdown voltage and lock in the dielectric charge.

Biaxial and uniaxial stretching enhances the polyvinylidene difluoride PVDF and/or the copolymer Polypolyvinylidene difluoride-tetrafluoroethylene PVDF-TFE dielectric constant breakdown and energy storage properties. In addition to energy storage and breakdown properties.

Various methods are available to create the DEUC layers. One method for fabricating the energy storage layer spray particle deposition. Another method of fabrication of the energy storage media is based on an extrusion of the core/shell particles suspended in an RTV, SBR or polymer mix.

DEUC cells, according to various embodiments, can be combined in a two or three dimensional configuration to further increase energy storage capacity. The three dimensional DEUC layers interconnect the multiple three dimensional DEUC layers to increase DEUC capacity.

To further increase performance, one or more of the anodes or cathodes can be designed as a lattice with dielectric particles interleaved in the electrode or cathode lattice to create increased surface interconnection between the anode and/or cathode with the energy storage media.

Temperature and/or electric voltage can affect the energy storage media causing contraction and/or swelling of the media. The storage media and the electrodes need to be compatible to ensure that the interconnection remains optimum between the two components.

The electrodes need to be flexible and move with the effects of the flexing of the storage media. Matching the characteristics of the polymer based energy storage layer with the conducting polymer electrode layer (i.e., matched polymer layers) is one means of maintaining a cohesive design. The electrode may be a metallic material or electrical conducting polymers. The preferred electrodes are made using an electrical conducting polymer to allow flexibility and to maintain a cohesive connection between the energy storage layer polymer and the electrodes.

Another method is the use of graphene as the electrode or as an interface between the energy storage media and the electrode.

In one embodiment, graphene material is proposed for the electrodes. Graphene is an allotrope of carbon. In graphene, carbon atoms are arranged in a regular hexagonal pattern. Graphene can be described as a one-atom thick layer of the mineral graphite. Multiple layers of graphene stacked together effectively form crystalline flake graphite.

Graphene differs from most conventional three-dimensional materials. Intrinsic graphene is a semi metal or zero-gap semiconductor. Experimental results from transport measurements show that graphene has remarkably high electron mobility at room temperature, with reported values in excess of 15,000 $cm^2$.

Graphene can also be configured as a tube or elongated particle. A 2-D or 3-D array of the graphene elongated particles could interconnect with the storage media and allow flexing of the storage media across temperature changes and applied voltage. The graphene could be connected to a metallic or conducting material to for the electrode and allow for interconnection of the anodes and cathodes to form a stack of ultracapacitor cells.

The extremely high surface area to mass ratio of graphene makes it an excellent candidate for the conductive plates electrodes, anodes and cathodes of the Dense Energy UltraCapacitor DEUC enabling greater energy storage density.

Electrical Conducting Polymers ECP provide a high performance electrode with matching thermal characteristics with the polymer binder of the energy storage media (i.e., matched polymer layers).

Polyaniline can be configured as a material with varying conductive and dielectric properties. Additives to the polyaniline can tune the dielectric constant and adjust the electrical conductivity to approach the performance of a metal conductor. One embodiment uses varying states of polyaniline to suspend the core/shell dielectric particles as a binder and increase conductivity at the electrode.

Polyanaline can be applied as a coating to black carbon particles and melted into a film with good distribution of the black carbon particles.

Polyanaline may be combined with conducting nano particles to increase conductivity.

Polyaniline can be applied in varying stages of electrical conductivity and dielectric properties to optimize the dense energy ultracapacitor.

Polyaniline has proven to uniformly adsorb on graphene preventing agglomeration of the graphene sheets. The Polyaniline/Graphene composite exhibits excellent electrochemical performance. Three-dimensional graphene structures can be formed using polyaniline/Graphene structures enabling high performance ultracapacitor electrodes.

Polyaniline can be configured to conduct across a wide range, from being utterly non-conductive for insulation use to highly conductive for other electrical purposes.

Another method for fabricating multiple layers of electrode and energy storage media is the use of ultrasonic nozzles that operate by converting high frequency sound waves into mechanical vibrations, which atomize liquids into mathematically defined micron sized droplets. These droplets have a very tight drop distribution, and their size is dictated by the frequency at which the nozzle operates.

Continuous vibrations of the nozzle disperse particles evenly in suspension during the coating process, creating homogeneous thin film layers of functional particles. 120 kHz and higher frequency nozzles have proven most successful. These higher frequency nozzles produce the smallest droplet sizes with effective deagglomeration of particles. This process is one method for a graphene coating processes to create the electrodes on the energy storage media. The graphene electrodes may be applied to the storage media preform prior to curing or to the cured storage media.

The DEUC may be integrated with photovoltaic or thermovoltaic systems to form an integrated energy generator and energy storage device.

While the particle size has a huge impact on the dielectric properties of CTTO-X and LNSO-X, the composition of the suspension media is equally as important.

The use of PVFD and/or the polymer blend of polyvinylidene difluoride-Chlorotrifluoroethylene PVFD-CTFE or a ceramic as a shell for a dielectric particle promotes better dispersion of the filler in the same or similar storage media and provides higher effective dielectric constants of the composites. The compatible shell/binder promotes stability and specific surface area of the media-filler interface minimizing defects or voids in the composite and increasing the breakdown strength and overall energy density. The introduction of metallic nano particles into the filler and/or the use of a conducting filler increases overall performance and energy storage.

Summary of Various Fabrication Methods

Fabrication methods for this disclosure relate generally to a process for manufacturing the Dense Energy UltraCapacitor DEUC including the synthesis of micro and/or nano composite dielectric particles. As an option the dielectric particles may be comprised of a dielectric core, the coating of said particles. The dielectric particles are integrated into a matrix to form an energy storage media and the application of electrodes to form a DEUC cell, stack and completed device.

The DEUC can be fabricated using several techniques. The inventor has evaluated the use of thin film spin coat devices and spray deposition. The challenges arise when one considers the need to create extremely thin films for the energy storage layer and the electrodes. Fabrication of films at the nano level pose challenges for electrode interconnection, the need to interconnect numerous layers to scale up the DEUC size to meet a standard AA battery and the length of the thin films required in to roll-up to form a AA battery.

Thin film spin coat provides a good method for prototype fabrication. A spin coat thin film of multiple layers reaching ten microns in thickness would need to be 70 inches long to roll up into an 18 mm diameter cylinder, similar to a AA battery.

Spray deposition provides a method to create long films to enable a thin film roll-up to reach the AA battery size, but requires curing of the individual layers in-between deposition layers. While this method is feasible it is time consuming and therefore costly.

The binder used to suspend the dielectric particles and/or core/shell particles may be an insulator or have conductivity. The binder may also be loaded with conductive nanoparticles such as but not limited to zinc, aluminum and silver.

Polymer Preform Stretched to Create Thin Film

The inventor has developed a Preform design for the DEUC where individual layers are extruded or spray coated to form the electrodes and energy storage layers. According to one example of a preform design, the electrically conducting polymer electrode layers sandwich the polymer PVDF or PVDF-CTFE energy storage layers, and the electrodes are offset left to right positive to negative to create a DEUC polymer multilayer sheet, or preform.

The DEUC polymer preform can be stretched uniaxial or biaxial to activate the PVDF polymer.

Polyvinylidene fluoride is a salt of hydrofluoric acid. Polyvinylidene difluoride is a semi-crystalline polymer that has four crystal polymorphs, referred to as alpha, beta, gamma, and delta. The conditions during melt processing of PVDF determine the type of crystal polymorph. The term polymorph is a colloquial term for polymorphonuclear leukocyte. Of the polymorphs, the alpha-phase and beta-phase are most common. The beta phase has the highest dipole moment. The highly polar beta-phase β-phase has excellent electrical properties, which include a high piezoelectric property.

Conversion of alpha phase to beta phase is possible through the application of heat and/or mechanical stress. The polymer stretching provides both a reduction to thin film thickness and the conversion of alpha phase to beta phase in the PVDF, improving overall performance. Stretching can be achieved by applying a temperature of around 90° C. and stretching to a ratio between 3.0 and 5. Temperature of at least around 90° C. can be applied to the Preform and/or the multilayer polymer thin film at least one of just before and during the stretching. FTIR spectra can be used to evaluate the variations of fl-phase in polymer films.

Figure 17:
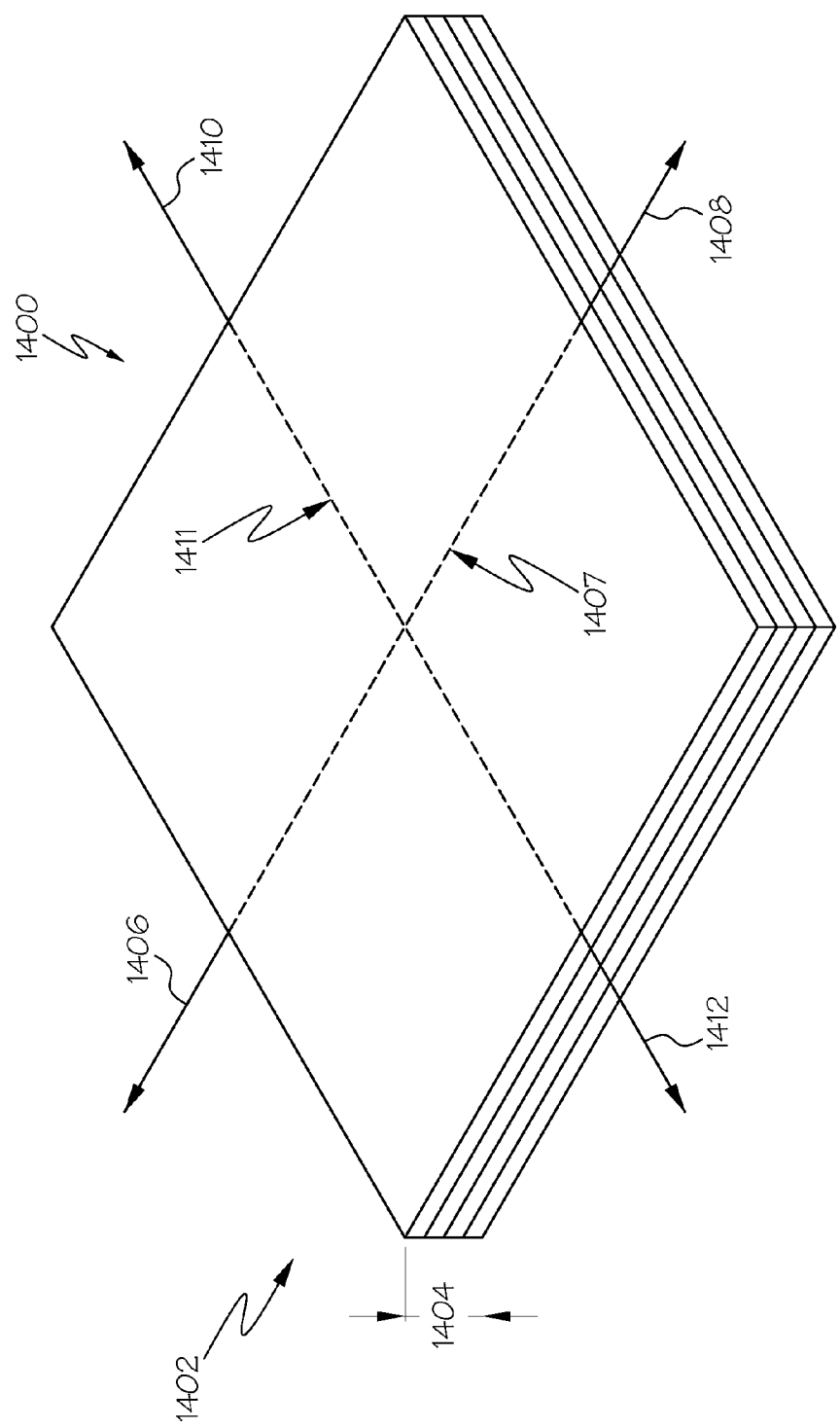
FIG. 17 is a diagram showing an example of layer reduction through stretching, according to the present disclosure.

Stretching of the multilayer DEUC can create thin film with reduced individual layers within the multilayer device. FIG. 17 illustrates an example of a biaxial stretch process 1400 where all four sides of the DEUC multilayer device (e.g., Preform or ribbon) 1402 can be pulled 1406, 1408, 1410, 1412 (e.g., along a first axis 1407 and along a second axis 1411) to reduce the multilayer thickness 1404 and thereby can reduce the thickness of the individual layers 1404 and can reduce DEUC structural features from the original DEUC multilayer device 1402 to a resulting stretched DEUC thin film device.

The DEUC Preform can be applied in a vertical or horizontal draw down process (or generally also referred to as a draw process). One example is a draw tower, where the larger version of the DEUC device is fabricated as a Preform and drawn down by the draw tower, for example, to form a DEUC multilayer thin film. Drawing down can be done in vertical, horizontal, and/or other directions according to various embodiments. The meaning of the terms "draw down" or "drawing down" or the like, should not be limited to drawing down in a vertical direction. For example, using a draw table the Preform can be drawn and stretched on the table such as along a generally horizontal direction. The multilayer thin film comprises one or more DEUC structural features in at least one dimension (e.g., thickness) that are proportionally reduced in comparison to the same DEUC structural features in the Preform. The DEUC structural features, according to various embodiments, may be reduced in a plurality of dimensions while drawing and creating a substantially symmetrical multilayer thin film ribbon replica of the Preform. This is shown by example in FIGS. 28 and 29 where the DEUC Preform 2001 is drawn down 2002 into a thin multilayer ribbon 2003 using the example draw tower 2005.

Current plastic fiber optic draw towers create 1 mm fibers from Preforms that are 100 mm in diameter or greater. Given this ratio the inventor expects to obtain multilayer thin film reduction ratios of at least 50 to 1, and likely reduction ratios of 100 to 1 or greater. The draw tower designed to support the DEUC would draw thin DEUC sheets, thin DEUC ribbons, and/or thin DEUC fibers.

The DEUC Preform can be applied in a stretching device using a uniaxial stretch or a biaxial stretch process to make reduced DEUC preform layers by stretching the Preform into a thin film. This is shown by example in FIG. 30 where the DEUC preform 2101 is stretched 2102 into a thin ribbon 2103. (See also the example shown in FIG. 17.)

In FIGS. 31, 32, 33, and 34, is illustrated an example DEUC draw process, in which DEUC structural features in the DEUC preform 2201 are reduced along at least one dimension 2202, 2203, 2204, as a result of the draw process. According to this example, the draw process pulls the DEUC preform 2201 generally along the length dimension (or length axis) 2204. The DEUC structural features in the DEUC preform 2201 can be reduced along the height dimension (or height axis or thickness) 2203 and along the width dimension (or width axis) 2202 as a result of the draw process. The draw process applied to the DEUC preform 2201 results in a DEUC ribbon 2210 with increased length 2214, reduced width 2212 and reduced height 2213. This draw process, for example, takes the original individual layer thicknesses 2205 of the DEUC preform 2201 and reduces the individual layer thicknesses 2215 in the DEUC ribbon 2210.

In FIGS. 35, 36, 37, and 38, is illustrated an example DEUC uniaxial stretch process, in which DEUC structural features in the DEUC preform or DEUC ribbon 2301 are reduced along at least one dimension 2302, 2303, 2304, as a result of the uniaxial stretch process. The uniaxial stretch results in a stretched DEUC ribbon 2310 with consistent length 2314, increased width 2312 and reduced height (or thickness) 2313. This uniaxial stretch process takes the original individual layer thicknesses 2305 of the DEUC preform or ribbon 2301 and reduces the individual layer thicknesses 2315 in the resulting stretched DEUC ribbon 2310.

In FIGS. 39, 40, 41, and 42, is illustrated an example DEUC biaxial stretch process, in which DEUC structural features in the DEUC preform or DEUC ribbon 2401 are reduced along at least one dimension 2402, 2403, 2404, as a result of the biaxial stretch process. The biaxial stretch of the DEUC preform or ribbon 2401 results in a DEUC stretched ribbon 2410 with increased length 2414, increased width 2412, and reduced height 2413. This biaxial stretch process takes the original individual layer thicknesses 2405 of the DEUC preform or ribbon 2401 and reduces the individual layer thickness 2415.

The draw process, uniaxial stretch process, and biaxial stretch process, may be combined in any order and applied to an original DEUC preform or ribbon to create a desired multilayer thin film with reduced individual layers and with reduced DEUC structural features along at least one dimension relative to the original DEUC preform or ribbon. The use of a Preform may be applied to other thin film devices including energy storage devices, capacitors, alternative energy systems, such as photovoltaic and thermovoltaic cells and systems.

Thick Film DEUC

For thick film DEUC designs, the dielectric particles can be suspended in RTV, polymer, ceramic, or styrene-butadiene rubber latex SBR loaded with metallic particles and cured to form a flexible structure. A polymer or ceramic material may also be used as the binder for suspending the dielectric particles and/or core/shell particles. The particles can be applied in one or more particle sizes to increase particle density.

One such method is the extrusion of the dielectric nanoparticles or dielectric core/shell particles in a room temperature vulcanized epoxy. RTV Silicone Room Temperature Vulcanizing Silicone is a type of silicone rubber made from a two-component system.

RTV is available in a hardness range of very soft to medium—usually from 15 Shore A to 40 Shore. RTV Silicones are cured with a catalyst. Particles can be added to the RTV to adapt the electric conductivity and dielectric properties for optimized performance of the dense energy ultracapacitor. The silicone RTV may be loaded with metallic nanoparticles.

Silicone used as a binder for the dielectric media provides a simplified production method but will have a limited temperature range and breakdown current. Plastics and ceramic binders can be applied for high temperature and high voltage applications.

Another method includes the use of SBR slurry for the extrusion of the core/shell particles and the use of conventional curing systems such as efficient vulcanisation EV systems, semi-efficient vulcanisation SEV systems, and conventional vulcanisation CV systems.

The dispersion of high dielectric nanoparticles in polymer or ceramic material can result in agglomerated nanoparticles, voids, and phase-separated mixtures leading to high dielectric loss and low dielectric strength. The coating of the particles with a polymer. Al2O3, or ceramic shell can enable a void-free dispersion of the dielectric particles in a polymer or ceramic matrix.

The polymer or ceramic may be loaded with metallic nanoparticles or a conductive polymer such as poylaniline may be configured as a conductor.

One method of fabrication of the energy storage media is based on a spray particle deposition with a mixture of dielectric particles or core/shell particles with filler particles in a specific ratio.

In another embodiment, the dielectric or core shell particles can be suspended in RTV or a slurry of styrene-butadiene rubber latex SBR and cured to form a flexible structured sheet. One such binder could be a room temperature vulcanization RTV silicone or epoxy, The particles can be applied in one or more particle sizes to increase particle density.

Another method of fabrication of the energy storage media is based on an extrusion of the core shell particles in a polymer mix.

Modified Polymers to Enable Extremely High Energy Density and Low Loss

The polymer binder can be modified to reduce the domain size inside the polymer mix to destabilize the ferroelectric phase leading to the formation of non-polar phase and much reduced ferroelectric hysteresis.

In the defects modified PVDF polymers, the defects bulky CTFE or HFP introduced break up the ferroelectric domains. As the domain size becomes smaller than some critical size, the ferroelectric phase becomes unstable, leading to the formation of non-polar phase and much reduced ferroelectric hysteresis.

Making use of low dielectric loss and high temperature stability of TFE and high dielectric constant of VDF/HFP, PTFE/HFP/VDF shows a higher energy density while maintaining low loss. Other combinations include PVDF-HFP-TFE with ratios in the range of 11/13/76 wt % that can double the energy density while significantly reducing the high field loss. Blending the high energy density PVDF-CTFE with a low dielectric loss polymer can reduce the dielectric loss and conduction loss at high fields.

Irradiation of the polymer binder can breakdown the polymer domain size inside the polymer mix to destabilize the ferroelectric phase leading to the formation of non-polar phase and much reduced ferroelectric hysteresis. That is, for example, irradiating the binder for particle suspension can significantly reduce ferroelectric hysteresis loss.

Electrodes

The electrodes need to be highly conductive and create an intricate bond with the energy storage media. The electrodes and energy storage media need to be compatible with thermal and/Attorney or electric voltage effects, or any other affects that would interfere with the electrode and storage media interconnection.

Electrodes may be composed of a one or more but not limited to conductive metals, conductive polymers, conductive greases, graphene, and/or a combination of any of these materials. The electrodes may be designed in a multi-layer 2-D or 3-D configuration.

The electrodes may be fabricated in a variety of methods, including but not limited to spray deposition, vapor deposition, extrusion, print spray.

The preferred embodiment uses an electrical conductive polymer to form the electrodes. The polymer electrode may be loaded with metallic nano particles to increase conductivity. The importance of the polymer electrode is the flexibility and similar properties with the polymer based energy storage layer. The energy storage layer may have movement under electrical load or temperature.

A rigid electrode may separate from the energy storage layer. The conducting polymer provides a cohesive interconnection with the energy storage layer in both temperature variations and electrical energy load and storage.

Graphene is an allotrope of carbon. In graphene, carbon atoms are arranged in a regular hexagonal pattern. Graphene can be described as a one-atom thick layer of the mineral graphite. Multiple layers of graphene stacked together effectively form crystalline flake graphite.

Graphene differs from most conventional three-dimensional materials. Intrinsic graphene is a semi metal or zero-gap semiconductor. Experimental results from transport measurements show that graphene has remarkably high electron mobility at room temperature, with reported values in excess of 15,000 $cm^2$.

The extremely high surface area to mass ratio of graphene makes it an excellent candidate for the conductive plates electrodes, anodes and cathodes of the Dense Energy UltraCapacitor DEUC enabling greater energy storage density.

The graphene string forms the electrode interface with the storage media and an embedded conductive material forms the connector for the electrode.

The graphene string allows the storage media to flex across temperature ranges and electrical affects while maintaining intimate contact and with not degradation of the graphene and storage media interface and contact.

Graphene can be applied on a metal conductor such as silver or integrated in to Polyaniline. Polyaniline has proven to uniformly adsorb on graphene preventing agglomeration of the graphene sheets. Conductive polymers such as polyaniline are excellent candidates for large volume or large scale applications.

In another embodiment, the thin film electrode is formed using thermal deposition of nickel in a liquid form with a curing process that forms nanowires creating a bonding layer between the electrode and the polymer matrix energy storage media.

The Polyaniline/Graphene composite exhibits excellent electrochemical performance. Three-dimensional graphene structures can be formed using polyaniline/Graphene structures enabling high performance ultracapacitor electrodes.

The graphene electrode can be mounted on a conductor such as polyaniline, silver or aluminum where the graphene makes intimate contact with the energy storage media and the metal conductor. The conductor allows for easy interconnectivity from cell to cell and to the electrical terminal. In another embodiment, the nano and/or micro particles may be suspended in a liquid or semi-liquid or gel.

Conductive polymers may be used to fabricate the electrodes. The conductive polymers may have metallic conductivity. The ability to produce stable dispersions makes PEDOT, poly3-methylthiophene pMeT and polyaniline excellent candidates for large volume or large scale applications.

Electrical Conducting Polymers ECP provide a high performance electrode with matching thermal characteristics with the polymer binder of the energy storage media (i.e., matched polymer layers).

A hybrid electrode configuration using activated carbon for the negative electrode and a electrical conducting polymer for the positive electrode enhances the performance of the ultracapacitor. An example would be a positive activated carbon electrode and a conductive polymer such as poly3-methylthiophene pMeT electrode for the negative electrode. This provides a strong advantage in terms of specific energy and power.

DEUC Preform and Thin Film System

A preferred method for the fabrication of the DEUC, according to one example, comprises the creation of a multi-layer "Preform" that emulates the cross section of one or more DEUC cells and the stretching of said Preform into a multi-layered thin film.

The individual layer types electrode and energy storage layer are fabricated and then formed together in a multi-layer sheet.

The use of all polymer binders allows the merging of the layers together under temperature to form a single multilayer sheet. The use of electrical conducting polymers allows for similar environmental characteristics of the electrode and energy storage layers, enabling a cohesive bond under temperature, electrical load and energy storage.

The stretching of the energy storage media using uniaxial and/or biaxial stretching of the CCTO/polymer matrix completes the $\alpha$ to $\beta$ phase transition of the polymer and dielectric particle matrix energy storage media. Optimum stretching conditions to create the $\beta$-phase transition is achieved at 80° C. with a stretch ratio of between 3 and 5.

In one embodiment, it is formed an energy storage media using PVDF polymer or a copolymer such as, but not limited to PVDF-CTFE loaded with CCTO particles and forming a film by various means including extruding the mixture into a thick film or sheet. The energy storage media is sandwiched between two conductive polymer layers each forming an electrode. The PVDF contains nonpolar alpha-phase. The PVDF polymer in the energy storage media can be converted to beta-phase by mechanical deformation-stretching. The stretching also assists in forming a thin film from a thick film. The three polymer layers are stretched together to create a thin film comprised of an upper electrode, an energy storage media layer and a lower electrode. The thin film is rolled up to form a cylindrical DEUC module.

In one embodiment, it is formed a PVDF-CTFE polymer thick film by various means including melted polymer loaded with the dielectric particles and extruding the mixture into a thick film or sheet. The PVDF-CTFE contains nonpolar alpha-phase.

The different phases in PVDF-CTFE film can be converted to beta-phase by mechanical deformation-stretching. The stretching also assists in forming a thin film from a thick film. A metallic layer is added to both sides of the energy storage media forming electrodes. The three thin film is rolled up to form a cylindrical DEUC module.

The effect of stretching conditions, such as stretching ratios, temperatures and rates of extension all have effects on the fraction of $\beta$-phase and the dielectric properties of the resulting thin film. The stretching process increases the dielectric constant of the polymer matrix and reduces the dielectric loss.

Figure 8:
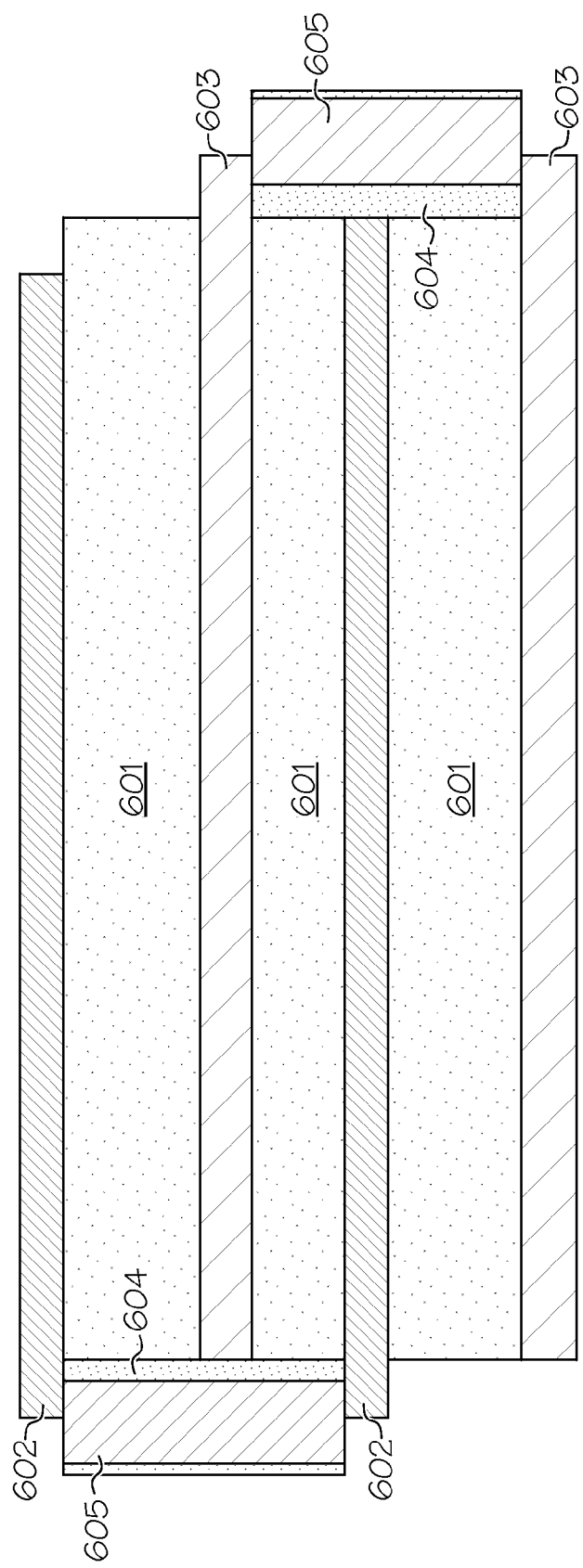
FIG. 8 is a cross-sectional side view of an example of a Preform Sheet Design for fabrication of a Stretched Polymer Dense Energy UltraCapacitor, according to the present disclosure.

In FIG. 8 is shown a DEUC preform with three DEUC cells in the cross section of a DEUC Preform. Three energy storage layers 601 are shown positioned in between electrodes 602 and 603. The electrodes are applied in an offset, negative electrode offset to the right side 603 and positive electrode offset to the left side 602.

An optional insulator 604 is applied to isolate the opposing electrodes in between the layers. This insulator may be comprised of energy storage media. Optional interleaved contacts 605 may be applied to interconnect the electrodes 602, 603, as shown.

Figure 9:
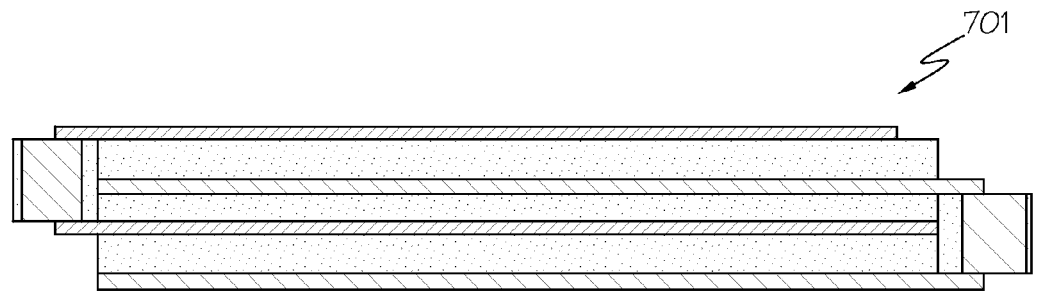
FIG. 9 is a cross-sectional side view of an example of a Dense Energy UltraCapacitor Thin Film resulting from a draw and/or stretch fabrication process applied to the Preform Sheet Design of FIG. 8, according to the present disclosure.
Figure 10:
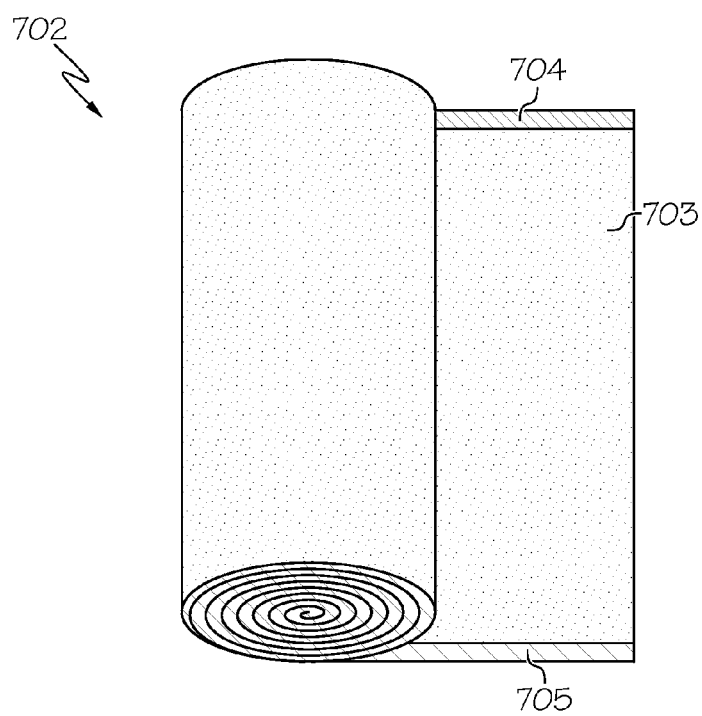
FIG. 10 is an illustration showing an example of a rollup of the Dense Energy UltraCapacitor Thin Film of FIG. 9, according to the present disclosure.

In FIGS. 9 and 10, the stretched DEUC Preform layers are reduced through the stretching process to create a thin film 701 and rolled up 702 to form a cylindrical DEUC cell or DEUC module 703 with positive electrode 704 and negative electrode 705.

The insulator and interleaved contacts may be applied after the stretching process. The application of a liquid or semi-liquid that cures to form the insulator, followed by an electrical conducting material that cures to interconnect the electrodes represents another option.

A draw tower can be used to pull or draw down the preform into a reduced size. The draw down ratio can be up to and exceed 1:1,000. This allows the fabrication of the preform in a larger scale that is easier to work with and then drawn down to reduce the thickness of each of the preform layers.

One example uses a multi-process draw and stretch routine that allows the first stage of the preform reduction to be drawn down into a thin ribbon by the draw tower or stretch extrusion device.

The second stage of reduction is performed by stretching the thin ribbon into a wide thin film to allow roll up into a DEUC cell as shown, for example, in FIGS. 9, 10, 22, and 23 to 27.

Another example uses the single draw down process where the DEUC preform is drawn down into a thin film and rolled into a DEUC cell.

Figure 18:
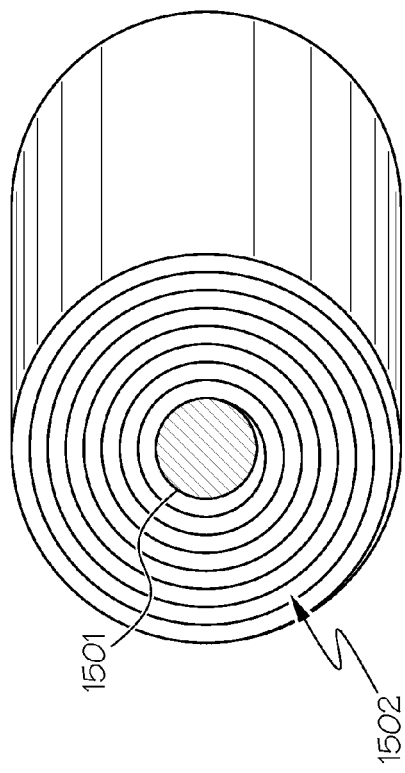
FIG. 18 is an illustration showing an example of an integrated radioisotope power generator, according to the present disclosure.
Figure 19:
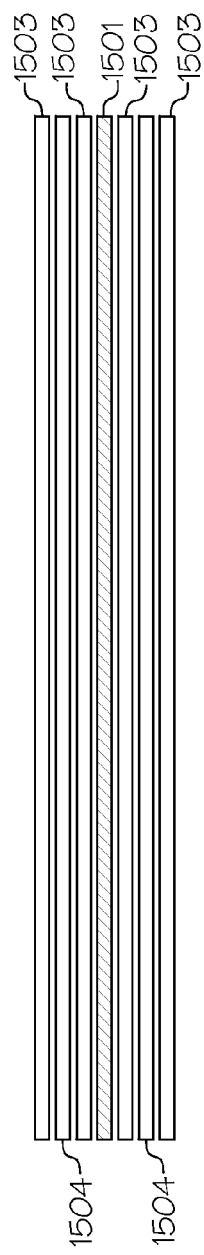
FIG. 19 is an illustration showing an example of layers of an integrated radioisotope power generator, according to the present disclosure.

FIGS. 17, 18 and 19 illustrate examples of stacking and rolling of the thin film. The drawn ribbon from the draw tower or extrusion pull device can be rolled to a specified diameter to form a cell. Multiple cells may be stacked and interconnected in series or in parallel to form a DEUC module.

Figure 22:
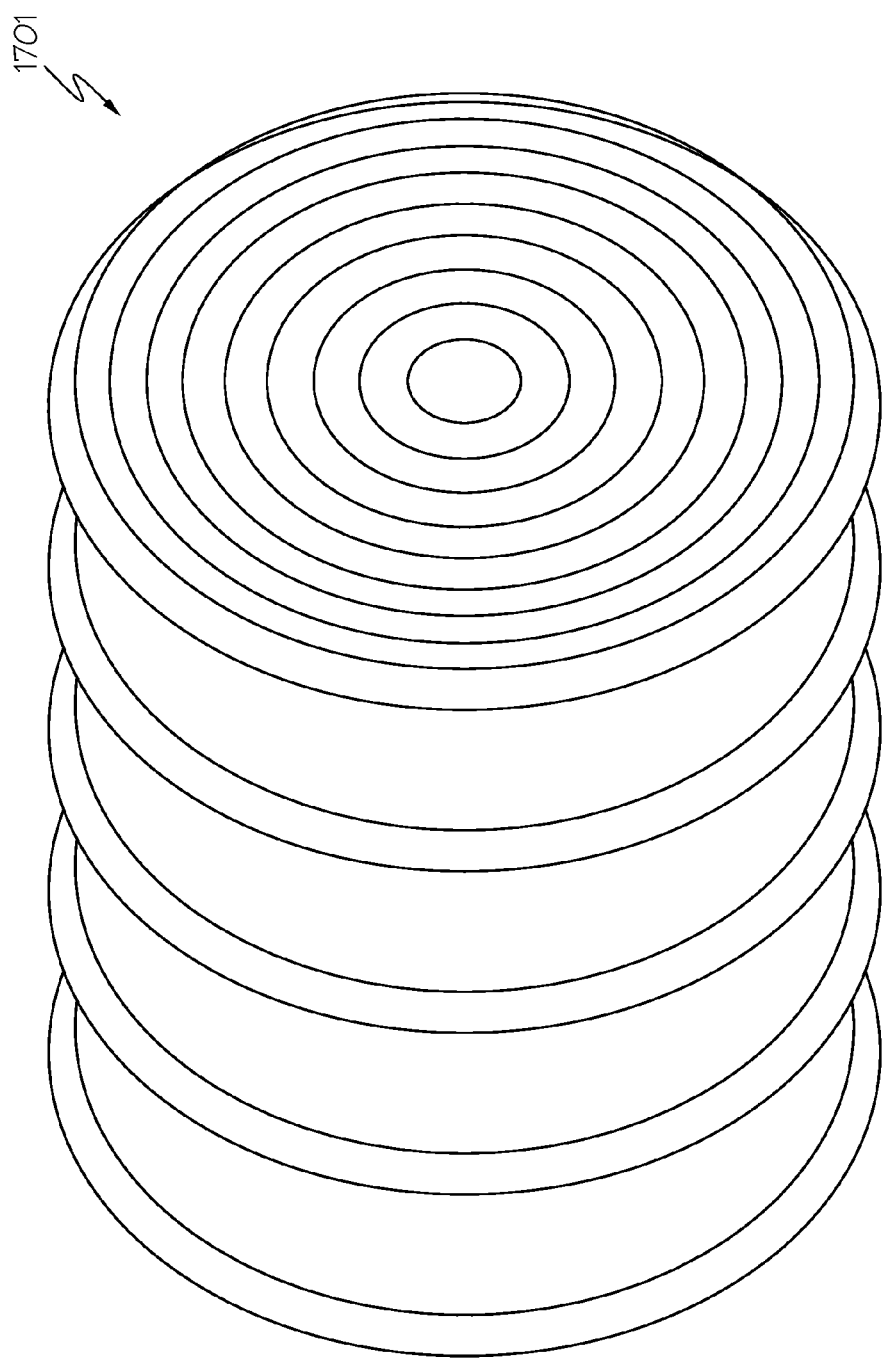
FIG. 22 is an illustration showing an example of Dense Energy UltraCapacitor cell and stack arrangement made from rolled Dense Energy UltraCapacitor thin film, according to the present disclosure.
Figure 23:
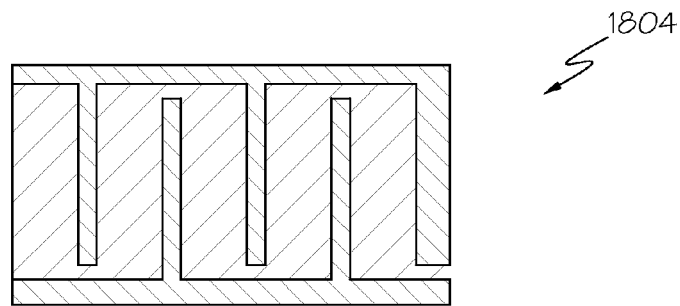
FIG. 23 is a cross-sectional side view of an example of Dense Energy UltraCapacitor cell rolled into a cylinder, according to the present disclosure.
Figure 24:
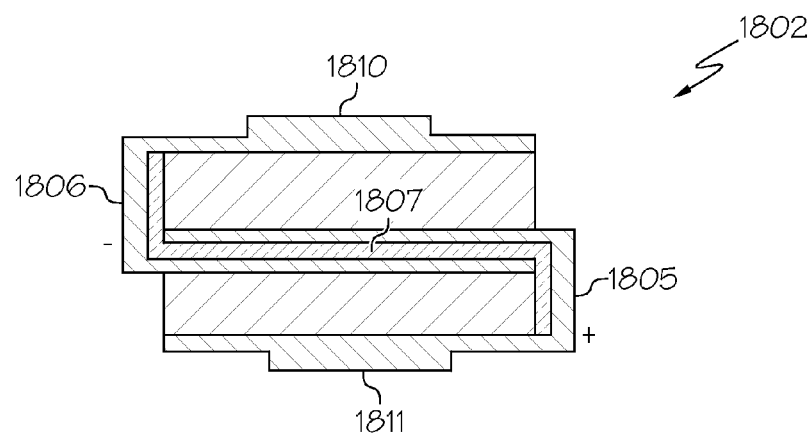
FIG. 24 is an illustration showing an example of Dense Energy UltraCapacitor cells in parallel interconnect, according to the present disclosure.
Figure 25:
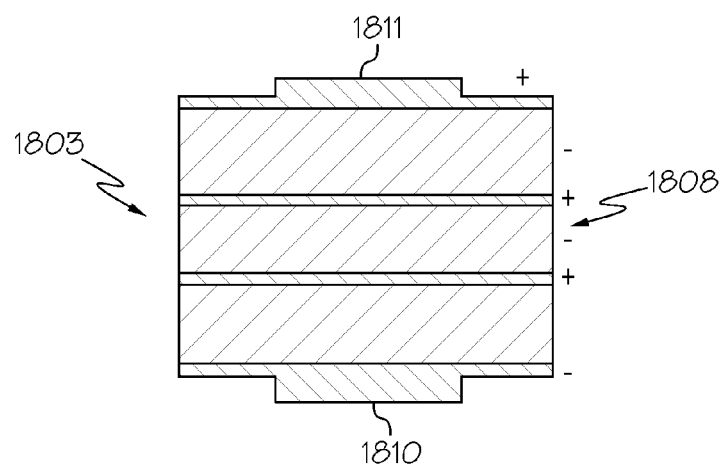
FIG. 25 is an illustration showing an example of Dense Energy UltraCapacitor cells in series interconnect, according to the present disclosure.

In FIGS. 23, 24, and 25, are shown examples of a DEUC cell 1804 which is rolled into a cylinder to form the cell (see FIG. 23), and DEUC cells interconnected in series 1803 (see FIG. 25), or interconnected in parallel 1802 (see FIG. 24), to form a DEUC module. Each of the thin film cells have one or more energy storage layers and two or more electrodes. For a parallel interconnection the positive electrodes 1805 are connected to the right with an insulator 1807 to separate the negative electrode 1806 connections on the left. The electrodes 1805 and 1806, in this example, are shown offset and separated from each other in a left/right orientation in a multilayer stack. The positive electrodes 1805 are connected to a positive terminal 1811, and the negative electrodes 1806 are connected to a negative terminal 1810. FIG. 22 shows an example of a Dense Energy UltraCapacitor cell and stack arrangement 1701 made from rolled Dense Energy UltraCapacitor thin film, according to the present disclosure.

Figure 27:
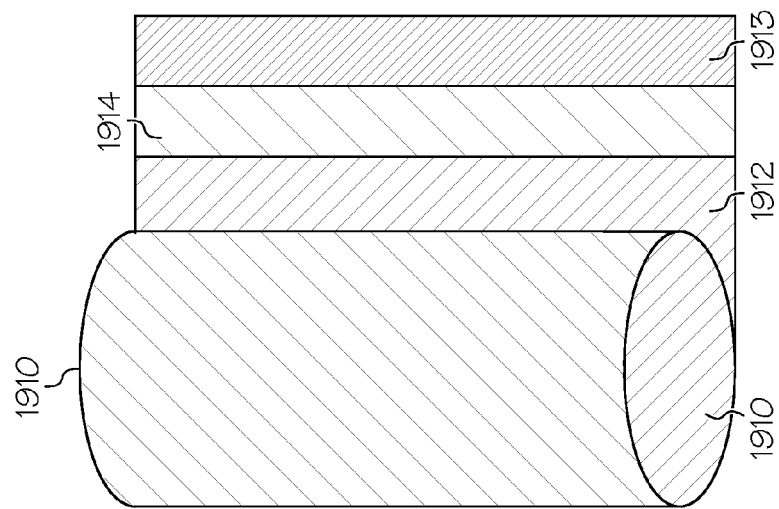
FIG. 27 is an illustration showing an example of a Dense Energy UltraCapacitor cell with an example of an electrode and terminal configuration, according to the present disclosure.
Figure 26:
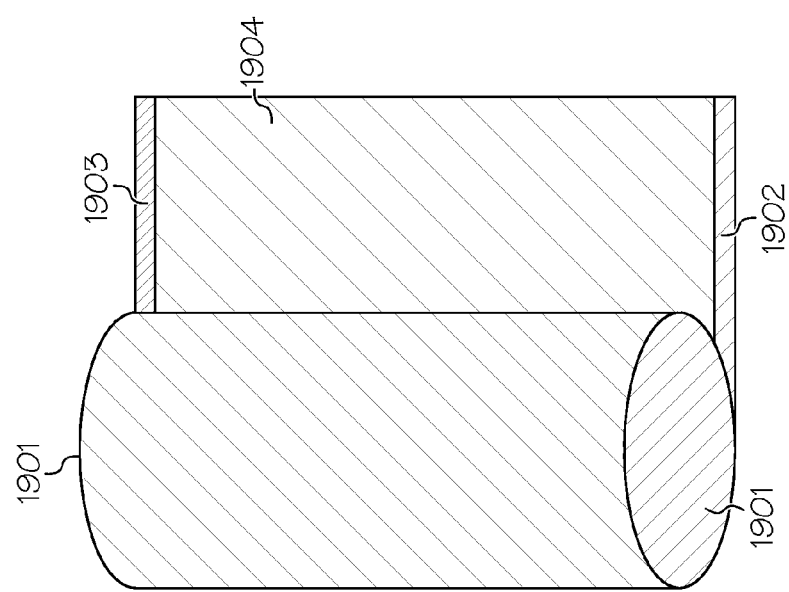
FIG. 26 is an illustration showing an example of a Dense Energy UltraCapacitor cell with an example of an electrode and terminal configuration, according to the present disclosure.
Figure 36:
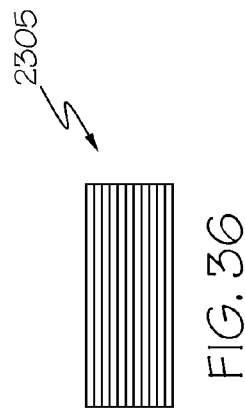
FIG. 36 is a cross-sectional side view of the Dense Energy UltraCapacitor preform and/or ribbon of FIG. 35.
Figure 38:
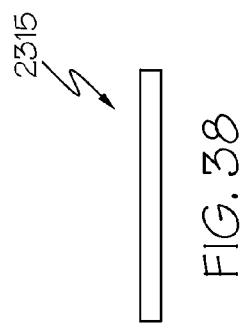
FIG. 38 is a cross-sectional side view of the example Dense Energy UltraCapacitor ribbon multilayer thin film of FIG. 37.
Figure 35:
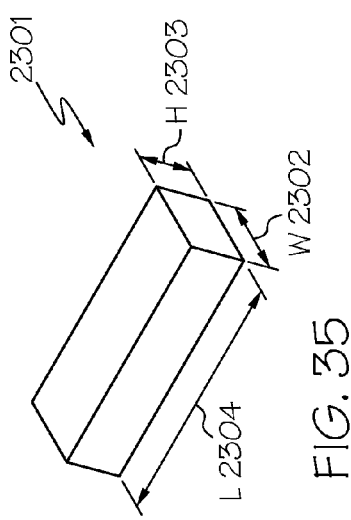
FIG. 35 is an illustration showing an example Dense Energy UltraCapacitor preform and/or ribbon for applying uniaxial stretching reduction to form a reduced ribbon multilayer thin film, according to the present disclosure.
Figure 37:
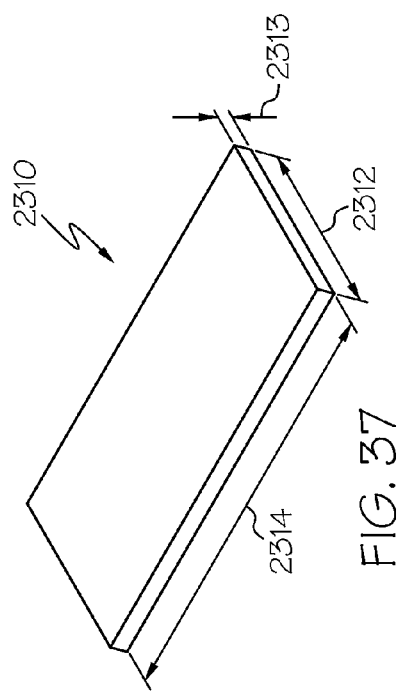
FIG. 37 is an illustration showing an example Dense Energy UltraCapacitor ribbon multilayer thin film resulting from applying uniaxial stretching reduction to the preform and/or ribbon shown in FIG. 35, according to the present disclosure.
Figure 40:
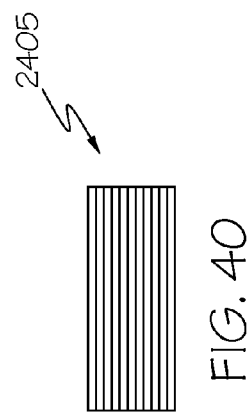
FIG. 40 is a cross-sectional side view of the Dense Energy UltraCapacitor preform and/or ribbon of FIG. 39.
Figure 42:
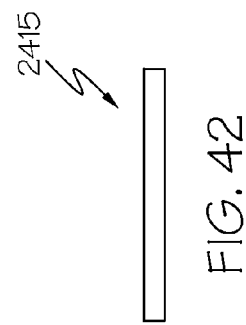
FIG. 42 is a cross-sectional side view of the example Dense Energy UltraCapacitor ribbon multilayer thin film of FIG. 41.
Figure 39:
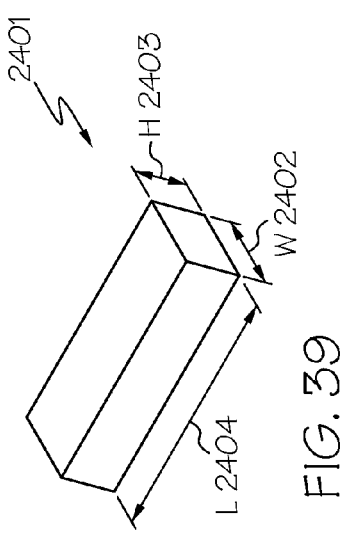
FIG. 39 is an illustration showing an example Dense Energy UltraCapacitor preform and/or ribbon for applying biaxial stretching reduction to form a reduced ribbon multilayer thin film, according to the present disclosure.
Figure 41:
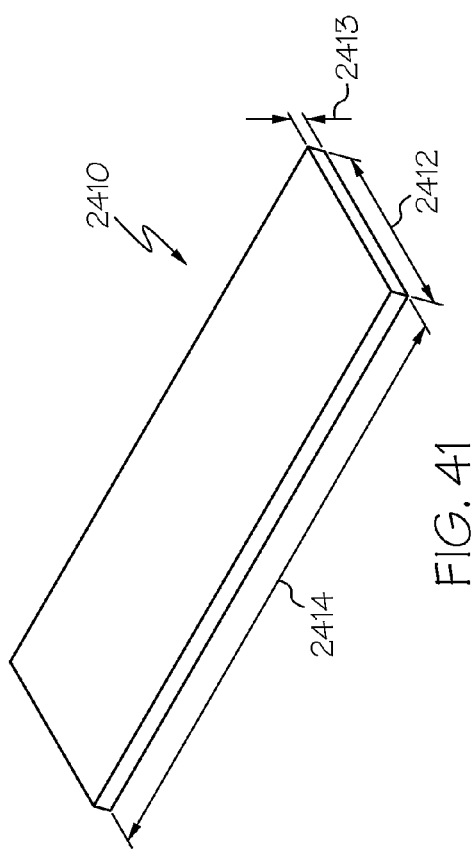
FIG. 41 is an illustration showing an example Dense Energy UltraCapacitor ribbon multilayer thin film resulting from applying biaxial stretching reduction to the preform and/or ribbon shown in FIG. 39, according to the present disclosure.

In FIGS. 26 and 27 are illustrated additional examples of separating the positive and negative electrodes and providing a terminal for each. As shown in FIG. 26 one method of forming positive and negative terminals 1901 for the DEUC module applies the positive and negative electrodes on opposing sides of the thin film 1904 for connection to positive 1903 and negative terminals 1902.

In another method of forming positive and negative terminals 1910 for the DEUC module shown in FIG. 27 the positive 1913 and negative 1912 electrodes are connected at the ends of the thin film 1914 to form positive 1913 and negative 1912 terminals.

In another embodiment, the Dense Energy UltraCapacitor DEUC device and/or the DEUC Preform can be produced using particle deposition methods. The process creates a multi-layer thin film device or preform for reduction.

Figure 43:
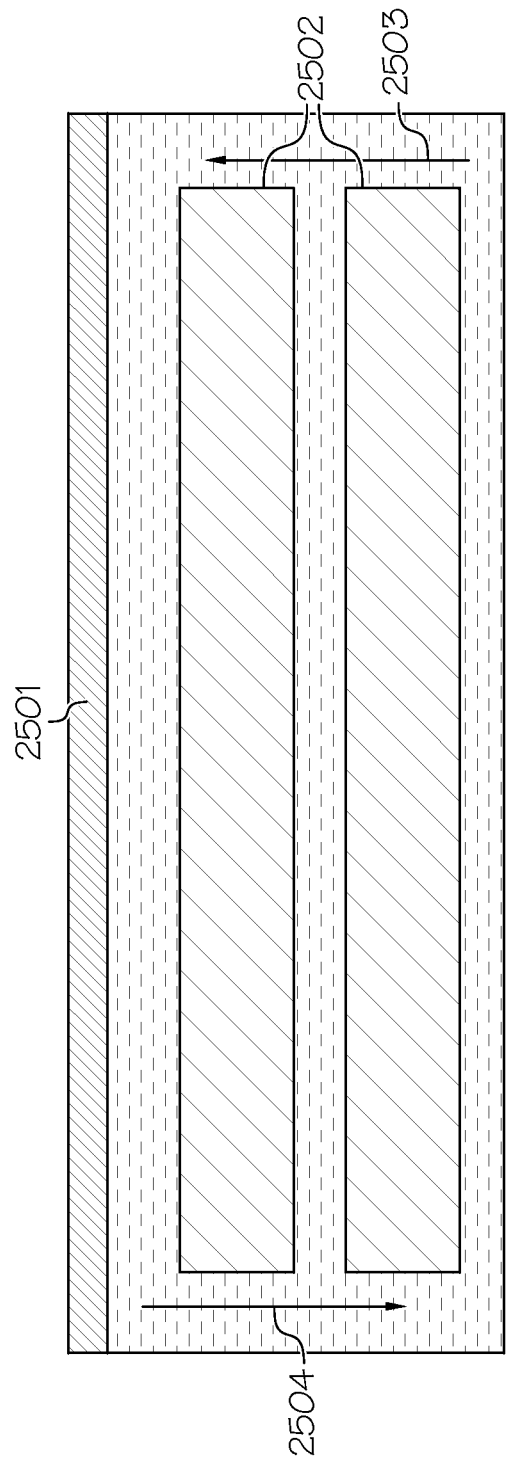
FIG. 43 is a cross-sectional side view of an example of a cooling system applied to an example Dense Energy UltraCapacitor array, according to the present disclosure.

In another embodiment, as illustrated in FIG. 43, one or more layers of the DEUC device (e.g., a DEUC multilayer thin film and/or a DEUC module) 2502 are spaced apart to form a cooling tunnel where heat within the DEUC is transferred into the cooling tunnel and moves to and is released through a thermal coupler 2501. The cooling tunnel could be filled with air, fluid or dielectric fluid to perform the heat transfer. A heat sink 2501 can be applied to absorb heat directly from the DEUC module or from the cooling tunnel. The cooling tunnel heat can be circulated 2503, 2504, through the DEUC body 2502 by convection or through the use of an active pump (not shown).

The DEUC is an energy storage device that can be applied to a broad range of applications and scaled from a micro device to a large system array. Examples of DEUC applications are circuit electronics, mobile devices, electric vehicles, residential and commercial applications, uninterruptible power supplies, support of the electric grid, and the storing of electrical power generated from alternative energy sources such as wind and solar.

The inventor's modeling data has demonstrated DEUC recharge cycles of over 1,000,000 without degradation even with deep cycling and rapid charging the DEUC. The DEUC provides a rapid recharge cycle time and store an estimated 4× the energy of a lithium-ion battery. An array of DEUCs could be configured as electrical energy stations to charge vehicles.

An example of a DEUC comprises high dielectric particles that are coated with a lower dielectric material and suspended in a binder with electrodes applied. The particles may be micro or nano particles and are comprised of standard or proprietary calcium copper titanate powder. In one embodiment, the dielectric particles may be further processed to form a core/shell particle. The outer shell of the core shell particles would have exceptional high voltage breakdown and increases the breakdown voltage of the core material. This very high voltage breakdown enables the DEUC to store large amounts of energy.

The outer shell would also assist in significantly lowering the leakage and aging of ceramic components comprised of the calcium copper titanate powder. The modeled discharge rate of the DEUC should be lower than 0.1% per 30 days which is approximately an order of magnitude lower than the best electrochemical battery.

The nano-particles may be mixed thoroughly with a binder such as an epoxy, polymer or ceramic to form an energy storage layer. Using an epoxy, the mixture is degassed using a vacuum.

One example method of fabrication for the DEUC is to create a preform comprised of multiple energy storage layers interleaved between electrode layers. Both the energy storage layers and the electrode layers are based on polymers that may have nanoparticles suspended in the polymer. The preform energy storage layers are fabricated as thick layers of 500 microns or more. The preform electrode layers are fabricated at $1:10^{th}$ of the energy storage layer or thinner. The stack of polymer based energy storage layers and electrode layers are formed into a preform by heating the stack to allow the polymer layers to attach to each other.

As shown in FIGS. 28 and 29, according to the present example, the preform 2001 is placed in a draw tower 2005 to be drawn down 2002, or reduced to a thin multilayer film (or thin ribbon) 2003. Draw towers are used in fiber optics to take a fiber optic preform and draw very thin fibers from the preform. This same principle can be used in the DEUC preform 2001 to create the thin multilayer film (or thin ribbon) 2003.

The DEUC preform is drawn down to a multilayer thin film. The multilayer thin film is a reduced version of the larger preform. The multilayer polymer thin film has DEUC structural features in at least one dimension proportionally reduced in comparison to the same DEUC structural features in the preform. The multilayer thin film can be rolled-up to form a battery module. Multiple battery modules can form an energy storage array.

In another example embodiment, the DEUC preform can be reduced using a combination of draw tower and uniaxial/biaxial stretching as shown in FIG. 30. For example, the DEUC preform 2101 can be drawn down and reduced by the draw tower in the first stage and stretched 2102 to form thinner multilayer film 2103 that is widened by the stretching process. The advantage of this combined process is the creation of a wide thin film (or thin ribbon) that can be rolled up to form a cylindrical energy storage device, resembling current rechargeable batteries. Or, the multilayer thin film can be stacked or folded to form a variety of shapes.

The fabrication of the energy storage layers and electrodes layers for the DEUC or DEUC preform can be accomplished in a variety of ways. The electrodes and storage media layers, for example, may be fabricated using a particle spray system or 3-D printing system.

The fabrication of the DEUC and/or DEUC preform may be applied to a roll-to-roll production process. Roll-to-roll processing, also known as web processing, reel-to-reel processing or R2R, is the process of creating electronic devices on a roll of flexible material. The methods of applying coatings, printing, or performing other processes start with a roll of a flexible material and are re-reeled after the process to create an output roll. Once the rolls of material have been coated, laminated or printed they are normally cut to their finished size.

The energy storage sheets are cut to fit the form and function of a specific applications and the electrodes are applied. The DEUC cells may be configured into 1-D, 2-D and/or 3-D arrays.

The DEUC has the potential to propel the electric vehicle EV industry that has suffered from limited driving distances, long charge times, limited numbers of recharges in the lithium-ion life-cycle and high cost of lithium ion batteries.

As shown in FIG. 1, multiple layers of the energy storage sheets 102 are applied to the DEUC cell. The anodes 101 and cathodes 103 are laid onto the top and bottom of an energy storage sheet 102. The energy storage sheet 102, according to one example, comprises CCTO High Dielectric Media, such as a matrix of CCTO with binder.

Figure 2:
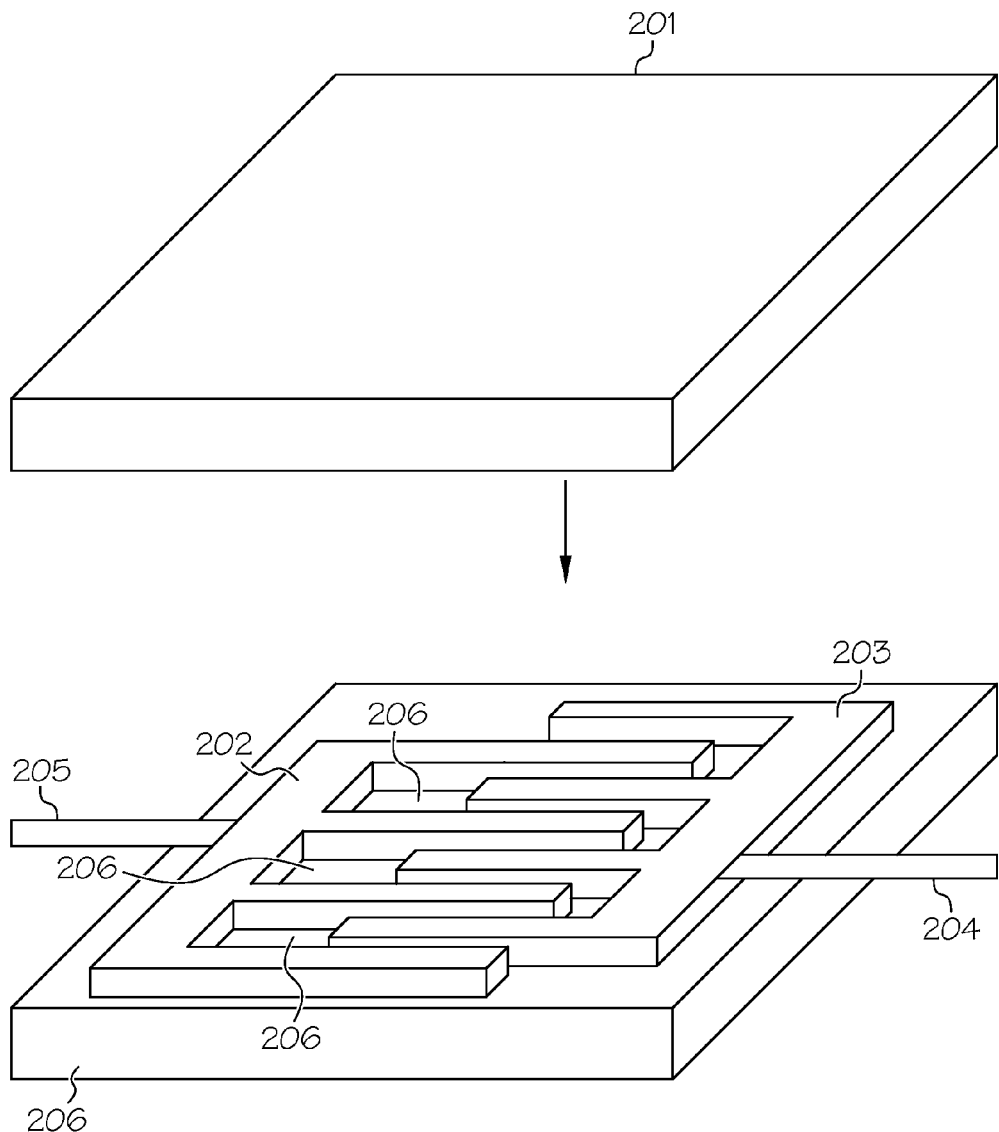
FIG. 2 is an illustration showing an example of a Dense Energy UltraCapacitor, according to the present disclosure.

In FIG. 2, the multiple layers of the energy storage sheets 201 are applied to the DEUC cell. The anodes 202 and cathodes 203 are laid onto the bottom energy storage sheet 206 with energy storage material 206 also placed in between the anodes 202 and cathodes 203. Terminal connections are provided as positive 205 and negative terminals 204.

Figure 3:
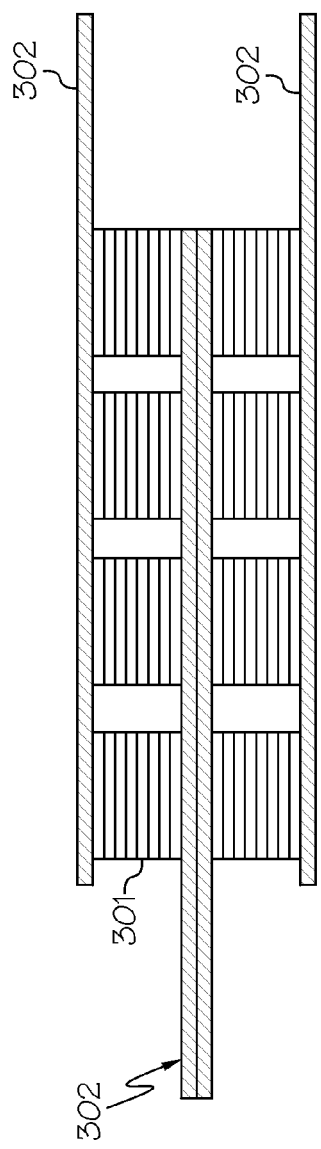
FIG. 3 is an illustration showing an example of a Dense Energy UltraCapacitor array configured as an Ultra Battery, according to the present disclosure.
Figure 4:
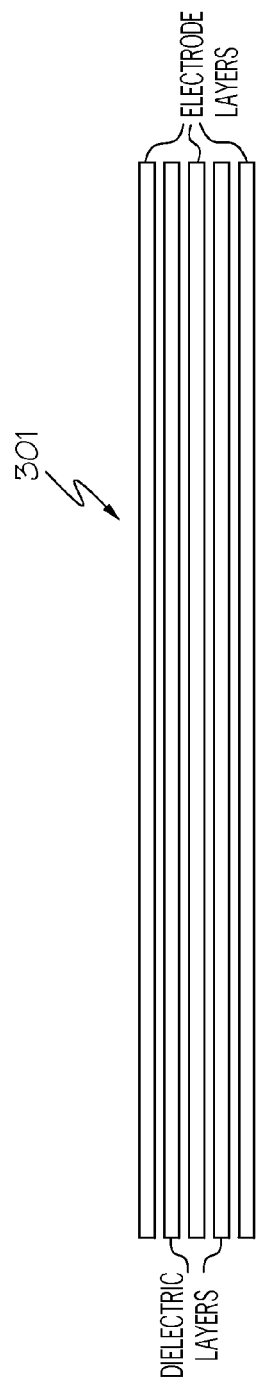
FIG. 4 is a more detailed side view of the Dense Energy UltraCapacitor Cell shown in FIG. 3.

In FIGS. 3 and 4 it is illustrated layers of DEUC cells placed in stacks 301 and grouped in an array with electrode terminals 302 connecting the array.

Figure 5:
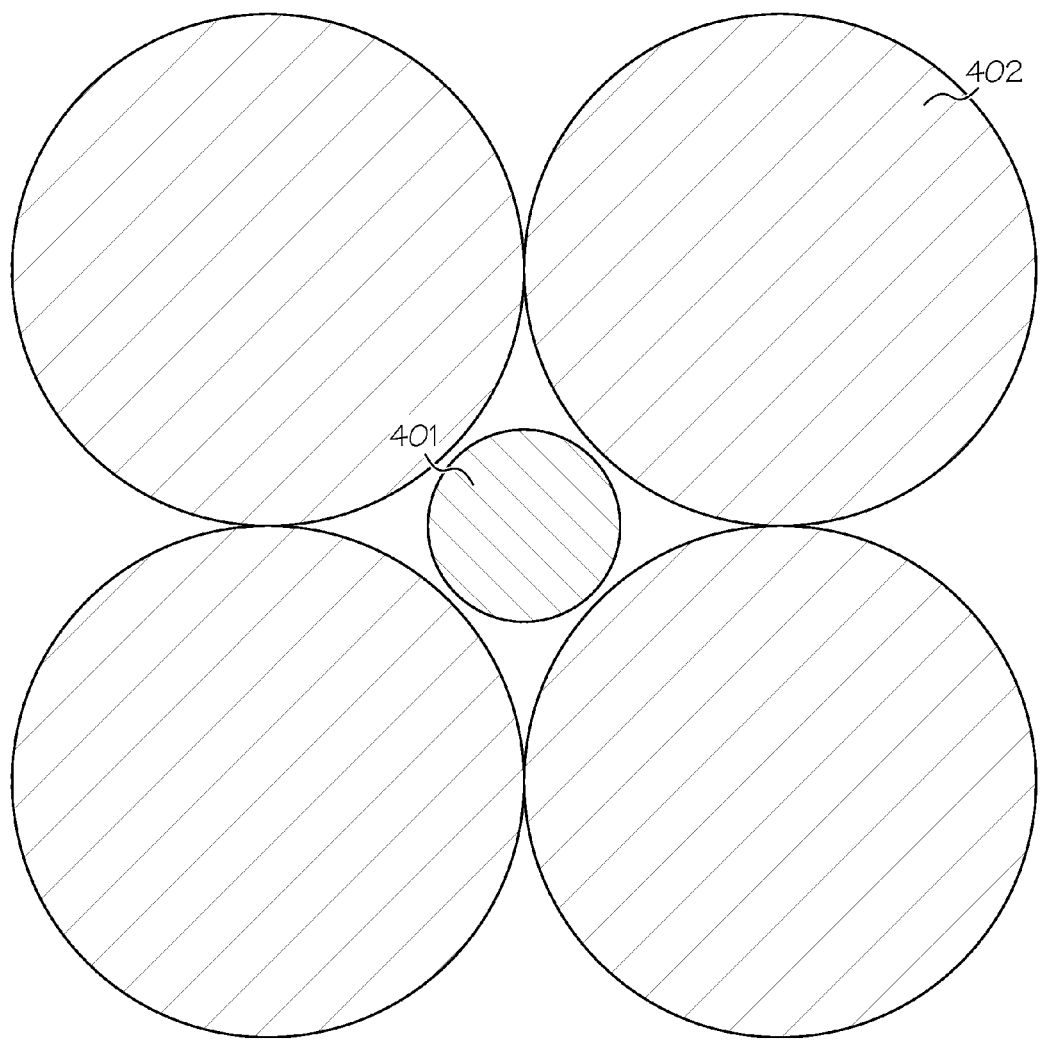
FIG. 5 is an illustration showing an example of a particle configuration, according to the present disclosure.

In FIG. 5 is illustrated the packing of the DEUC particles where a single particle 401 or multiple particle size 402 combination may be applied.

Figure 6:
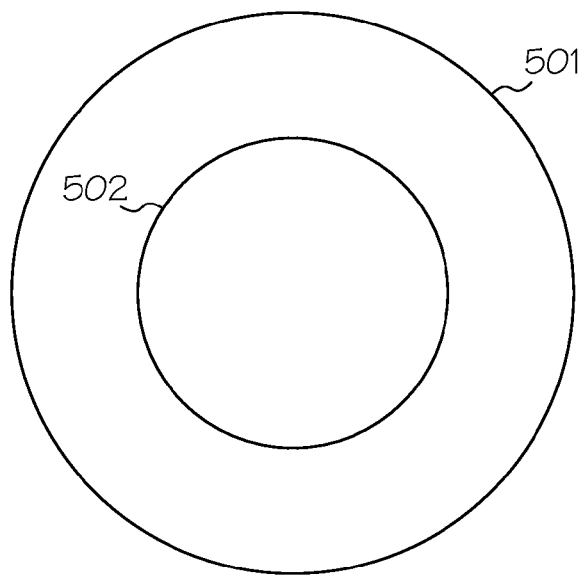
FIG. 6 is an illustration showing an example of a particle shell and particle core configuration, according to the present disclosure.
Figure 7:
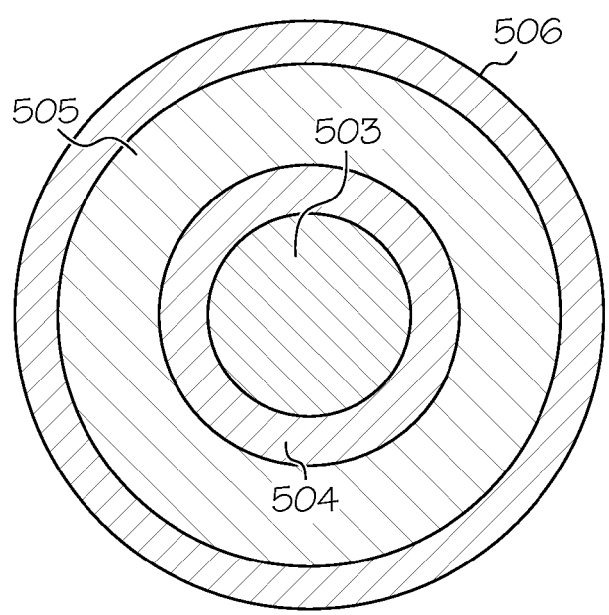
FIG. 7 is a cross-sectional side view of the example particle shell and core shown in FIG. 6, according to the present disclosure.

In FIGS. 6 and 7 it is illustrated the core 502/shell 501 design of the dielectric particle. Also illustrated is the multilayer dielectric particle where the core dielectric 503 has a shell 504 another dielectric layer of smaller particles 505 and an outer shell 505. Additional layers may continue.

In FIG. 8 it is shown a DEUC preform with three DEUC cells in the cross section of a DEUC Preform sheet. Three energy storage layers 601 are shown positioned in between electrodes 602 and 603. The electrodes are applied in an offset, negative electrode offset to the right side 603 and positive electrode offset to the left side 602.

An optional insulator 604 is applied to isolate the opposing electrodes in between the layers. This insulator may be comprised of energy storage media. Optional interleaved contacts 605 may be applied to interconnect the electrodes.

In FIGS. 9 and 10, the stretched DEUC Preform layers are reduced through the stretching process to create a thin film 701, 703, and rolled up 702 to form a cylindrical DEUC module with positive electrode 704 and negative electrode 705.

The insulator and interleaved contacts may be applied after the stretching process. The application of a liquid or semi-liquid that cures to form the insulator, followed by an electrical conducting material that cures to interconnect the electrodes represents another option.

In FIG. 11 is shown a suspended particle dense energy ultracapacitor DEUC that provides rapid charge and energy storage consisting of electrodes acting as an anode and cathode that are spaced apart by a high dielectric energy storage media that is applied in layers of different high dielectric particle configurations where the high dielectric particles are comprised of one or more dielectric particles and lower dielectric shell layers 801, 802 that are suspended in a liquid, semi-liquid gel or solid binder material and positioned between said electrodes 803. In this example, one layer 801 comprises smaller dielectric particles in binder, while a second layer 802 comprises larger dielectric particles in binder.

Figure 12:
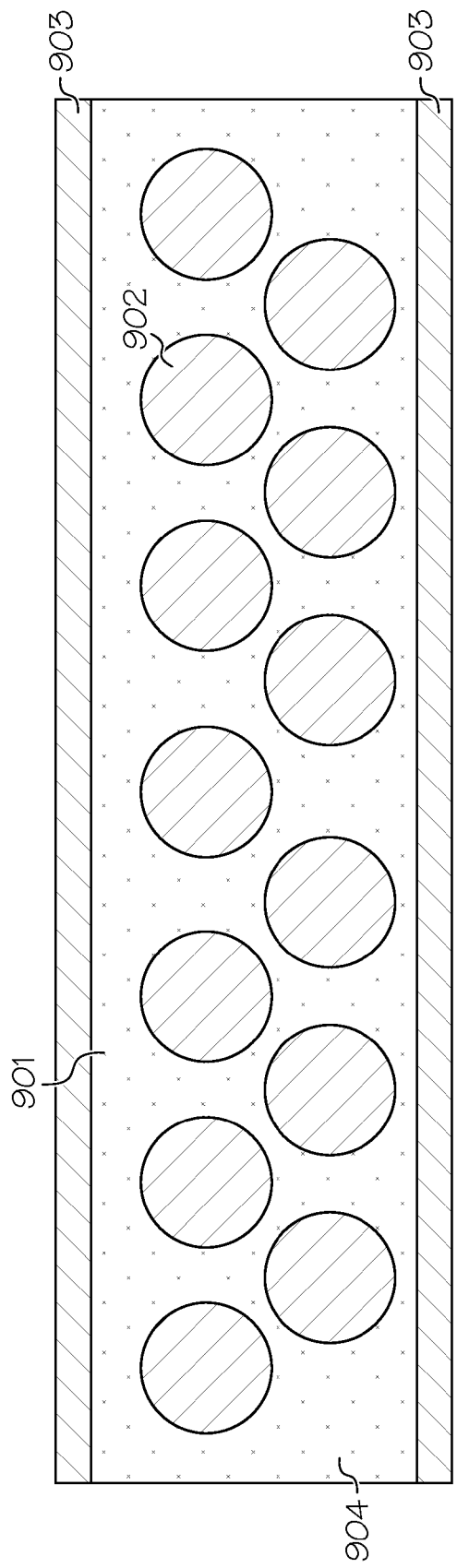
FIG. 12 is a cross-sectional side view of an example of mixed particle size energy storage media, according to the present disclosure.

FIG. 12 illustrates a suspended particle dense energy ultracapacitor DEUC that provides rapid charge and energy storage consisting of electrodes 903 acting as an anode and cathode that are spaced apart by a high dielectric energy storage media that comprises a mixture of smaller dielectric particle size particles 901 and larger dielectric particle size particles 902, enabling high filler density for the dielectric particles 901, 902 in the binder 904.

Figures 13, 14:
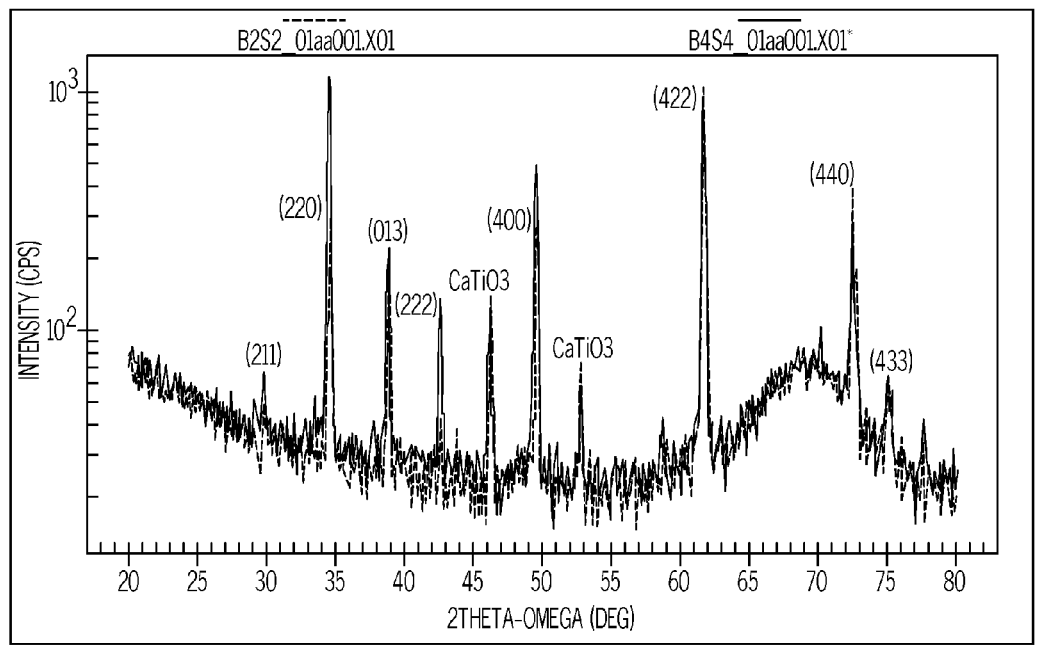
FIG. 13 is a plot diagram showing an XRD diffractogram of CCTO ceramic.
FIG. 14 is a table showing data from an elemental analysis of CCTO ceramic.
Figure 15B:
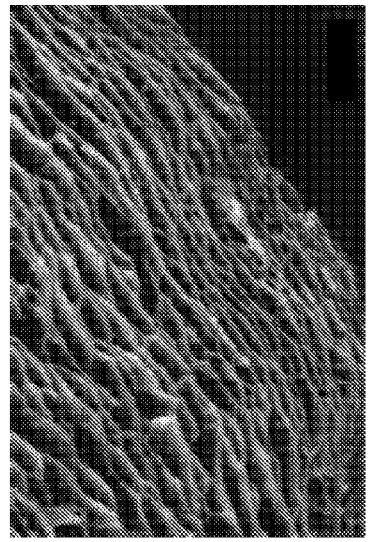
FIGS. 15a to 15d provide several illustrations of various carbon fiber and/or graphene designs.
Figure 15D:
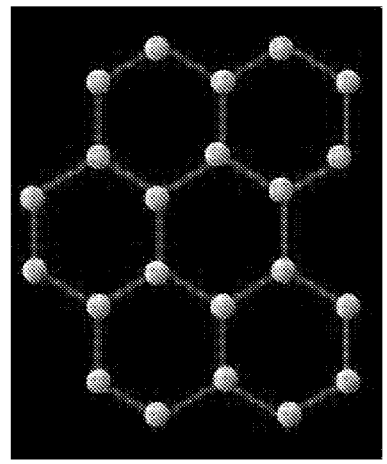
Figure 15A:
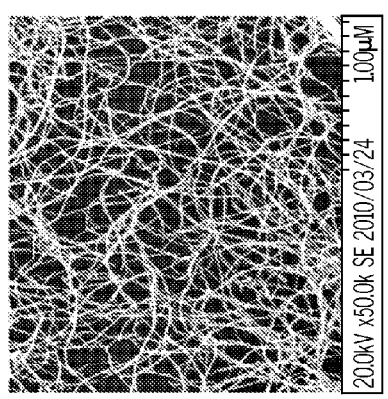
Figure 15C:
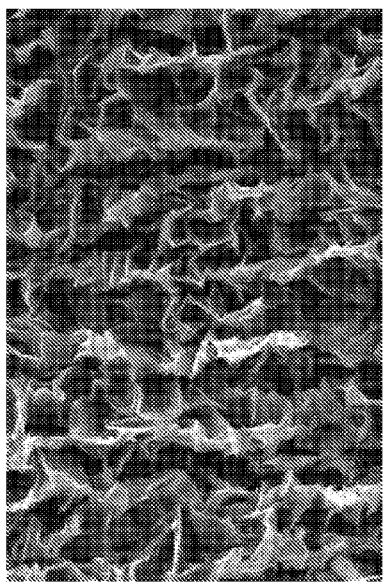

FIG. 13 shows an example XRD diffractogram of CCTO ceramic. In FIG. 14, it is shown an example elemental analysis of CCTO ceramic. FIG. 15 illustrates various carbon fiber and/or graphene designs. FIG. 15A shows an example of carbon fiber. FIG. 15B shows an example of graphene fiber. FIG. 15C shows an example 3-dimension view of graphene. FIG. 15D shows an example model view of graphene structures.

Figure 16:
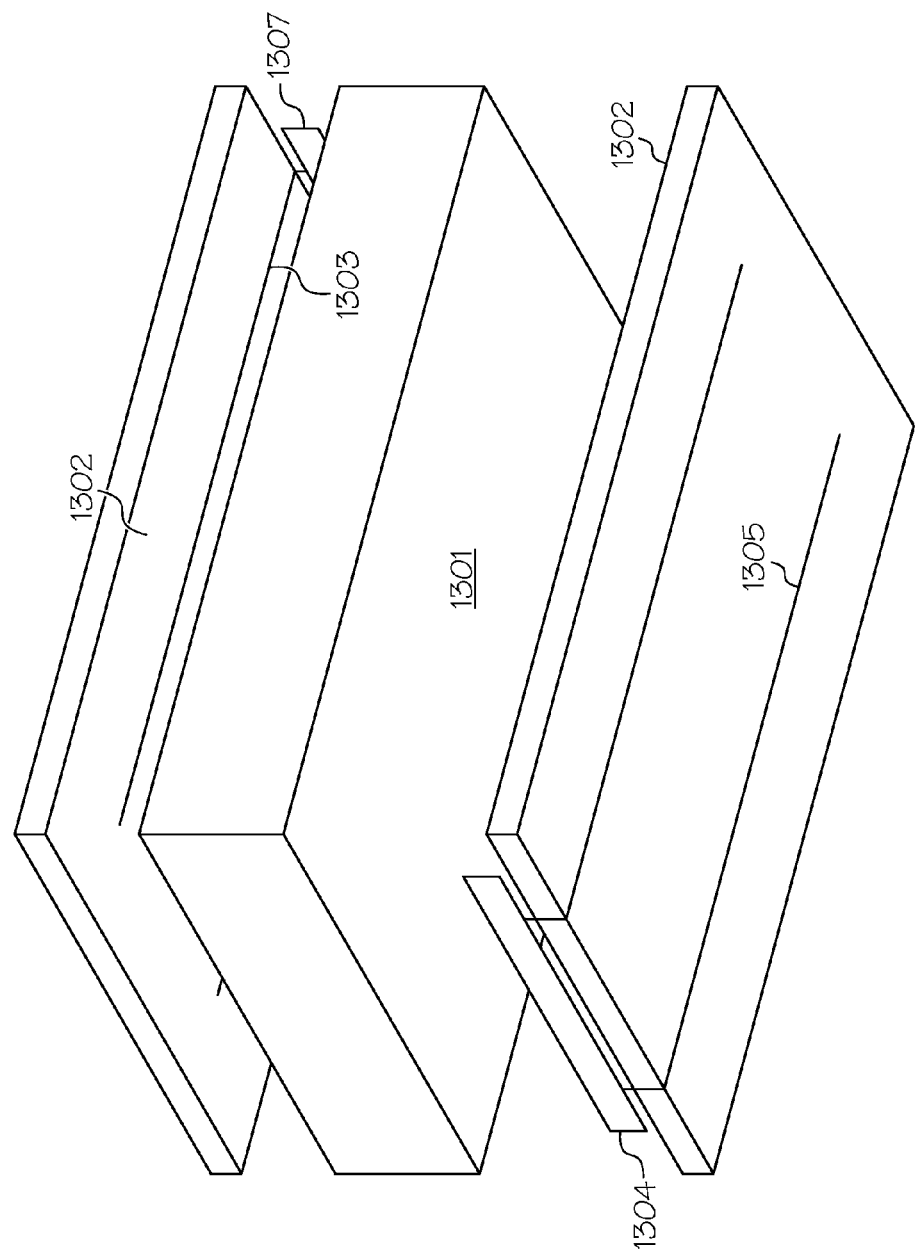
FIG. 16 is an illustration showing an example of flexible electrodes, according to the present disclosure.

FIG. 16 illustrates an example of a flexible electrode applied in an example DEUC design. Storage media 1301 is sandwiched in between two electrodes 1302 comprising graphene material. Either or both electrodes 1302 can be made flexible electrode according to the fabrication methods and techniques discussed herein. A conductive metal anode 1303 is disposed along one of the two electrodes 1302 and is electrically coupled with an electrical terminal 1307 as shown. The electrical terminal 1307, in this example, can be made from one or more of conductive metal, graphene, active carbon, or conductive polymer. A conductive metal cathode 1305 is disposed along another one of the two electrodes 1302 and is electrically coupled with an electrical terminal 1304 as shown. The electrical terminal 1304, in this example, can be made from one or more of conductive metal, graphene, active carbon, or conductive polymer. The two electrical terminals 1304, 1307, are located, in this example, at generally opposing sides of the DEUC device as shown.

FIG. 17 shows an example of layer reduction through stretching. FIG. 17 illustrates an example of a biaxial stretch process 1400 where all four sides of the DEUC multilayer device (e.g., Preform or ribbon) 1402 can be pulled 1406, 1408, 1410, 1412 (e.g., along a first axis 1407 and along a second axis 1411) to reduce the multilayer thickness 1404 and thereby can reduce the thickness of the individual layers 1404 and can reduce DEUC structural features from the original DEUC multilayer device 1402 to a resulting stretched DEUC thin film device.

In FIGS. 18 and 19, it is illustrated an example integration of radioisotope power generator 1501 coupled with the DEUC layers 1502 in a cylindrical arrangement for continuous recharge. The dielectric design of the DEUC includes the electrode layers 1503 and dielectric layers 1504 surrounding the radioisotope power generation layer 1501, and elimination of the chemical reaction battery technology which enables continuous recharge without battery degradation. Note that in the example shown in FIG. 18, one half of the layers 1501, 1503, and 1504, shown in FIG. 19, are rolled up into a cylindrical structure arrangement with the radioisotope power generation layer 1501 being rolled into itself at the center of the cylindrical structure arrangement.

Figure 20:
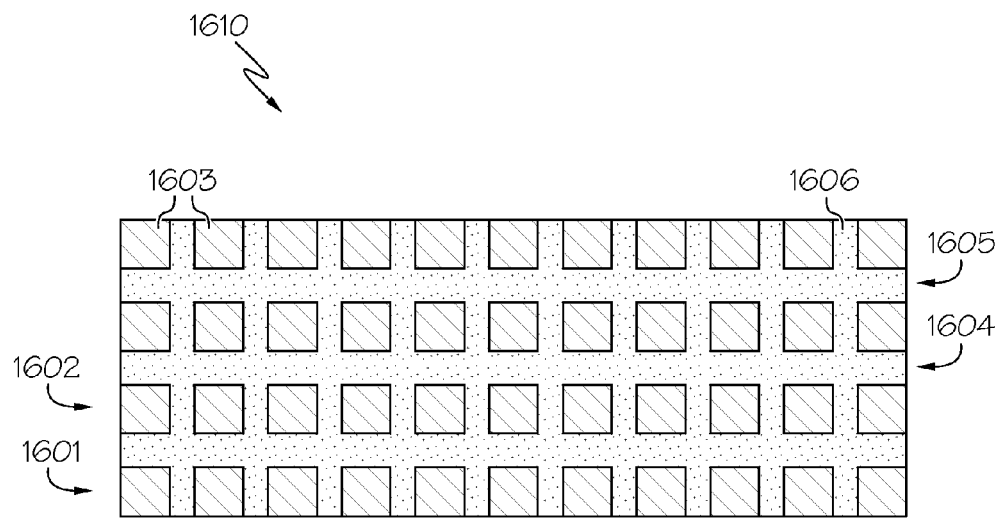
FIG. 20 is an illustration showing an example of a side view of interleaved electrodes Dense Energy UltraCapacitor cell and stack, according to the present disclosure.
Figure 21:
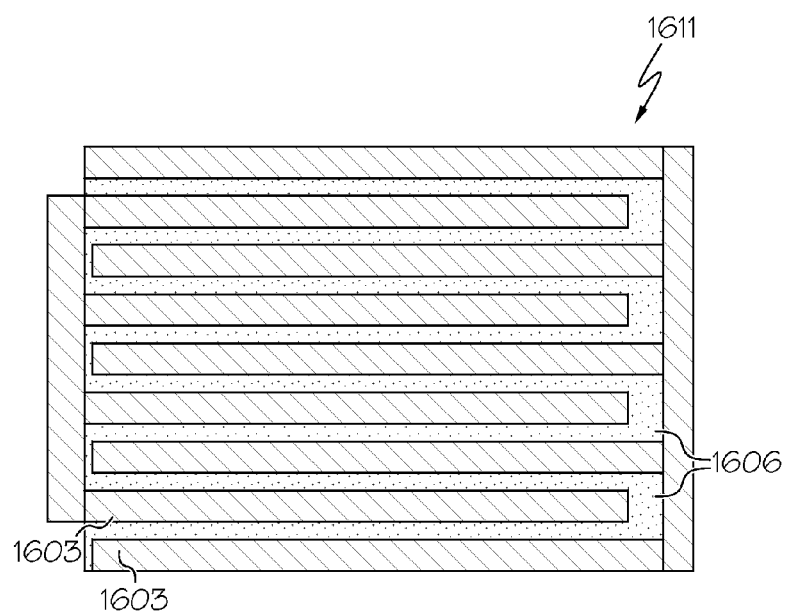
FIG. 21 is an illustration showing a top view of the example interleaved electrodes Dense Energy UltraCapacitor cell and stack shown in FIG. 20.

In FIGS. 20 and 21, it is illustrated a side view 1610 and a top view 1611 of the interleaved electrode DEUC cell and stack, forming increased surface area in between the electrodes 1603, comprising first electrode layer 1601 and second electrode layer 1602, and energy storage media 1606 comprising first energy storage layer 1605 and second energy storage layer 1604.

In FIG. 43 it is illustrated a passive cooling process where transferred heat from the DEUC module(s) 2502 heats a liquid. According to a convection liquid transfer process, the heated liquid 2503 rises to meet a heat dissipation device 2501 such as a thermocoupler and the cooled liquid 2504 falls towards the bottom of the DEUC module device 2502.

The features and advantages described in the specification are not all inclusive, and particularly, many additional features and advantages will be apparent to one of ordinary skill in the art in view of the description, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The present subject matter can be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a conversion to another language, code or, notation; and b reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory ROM, flash memory, disk drive memory, CD-ROM, and other permanent storage. Additionally, a computer medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A suspended particle Dense Energy Ultracapacitor (DEUC) preform for fabricating a DEUC module that provides rapid charge and energy storage, comprising:
a multilayer polymer DEUC preform in a complex circuit pattern (Preform) having a size, a shape, and an arrangement of a plurality of matched polymer layers in the micron thickness range that are attached together to form a unified Preform, the matched polymer layers having at least thermal characteristics matching for all the matched polymer layers, the Preform being designed and constructed for drawing by a draw process that stretches the unified Preform to a ratio greater than 1:50 and simultaneously reduces the plurality of matched polymer layers of the unified Preform into a multilayer thin film comprised of nano layers, of nano thickness or less, having DEUC structural features in at least one dimension proportionally reduced in comparison to the same DEUC structural features in the Preform; and
where one or more of the plurality of matched polymer layers of the Preform comprise negative and positive electrodes made from conducting polymer and that are spaced apart by suspended particle high dielectric energy storage media;
where one or more layers of the plurality of matched polymer layers of the Preform comprise suspended particle high dielectric energy storage media (Energy layer);
where the high dielectric energy storage media comprises high dielectric particles that are nano sized particles which are surface modified by surrounding each particle with a protective coating to provide an electrically insulating shell applied to and surrounding each of the particles (Particles) preventing contact between the particle and the polymer layer suspending the particle, the Particles suspended in a binder comprising at least one of a polymer, a copolymer, and a terpolymer;
where alternating electrode layers are offset forming the Preform;
where the alternating electrode layers of the Preform are insulated from each other to form a left side electrode array and right side electrode array;
where each electrode array is interconnected to form a single electrode interface; and
where the Energy layer and electrode layer polymers are cured forming a cohesive and unified Preform.

2. The suspended particle DEUC preform of claim 1, wherein the dielectric particles comprise at least one of:
a unique version of calcium copper titanate oxide where common calcium copper titanate oxide ($CaCu_3Ti_4O_{12}$) also referred to as CCTO is modified to form the unique CCTO-X ($Ca_xCux_xTi_xO_x$); with variations in the amounts of copper Ca, Cu and/or Ti content, and
where CCTO-X is doped with one or more materials including but not limited to at least one of zinc, silver, aluminum, strontium and lanthanum, and
where CCTO-X particles are surfaced modified to have an electrically insulating shell surrounding the CCTO-X particle.

3. The suspended particle DEUC preform of claim 1, wherein the dielectric particles comprise at least one of:
LSNO (La15/8Sr1/8NiO4) particles; which are applied in a uniform distribution suspended in a polymer binder to form a suspended particle high dielectric energy storage media that is positioned between the electrodes; and
titanium phenyl phosphate particles which are applied in a uniform distribution suspended in a polymer binder to form a suspended particle high dielectric energy storage media that is positioned between the electrodes.

4. The suspended particle DEUC preform of claim 1, wherein the binder comprises at least one of:
a polyvinylidene fluoride and/or polyvinylidene difluoride individually and collectively referred to as PVDF polymer; and
a polymer mixture of PVDF polymer and one or more low dielectric loss polymers comprising at least one of copolymers and terpolymers reducing dielectric loss of the binder.

5. The DEUC preform of claim 1, wherein the at least a portion of the multilayer thin film comprises a thin film ribbon, and wherein at least one of:
at least a portion of the thin film ribbon forming a DEUC ultracapacitor;
multiple portions of the thin film ribbon being stacked together to form a DEUC ultracapacitor;
a portion of the thin film ribbon being wound into a cylinder forming a DEUC ultracapacitor having many layers; and
a portion of the thin film ribbon being wound into a cylinder forming a DEUC ultracapacitor in which the cylinder is further formed into any one of a plurality of various shapes.

6. A suspended particle Dense Energy Ultracapacitor (DEUC) thin film for fabricating a DEUC module that provides rapid charge and energy storage, comprising:
a multilayer polymer thin film comprising a plurality of matched polymer layers, the matched polymer layers having at least thermal characteristics matching for all the matched polymer layers, the matched polymer layers having DEUC structural features resulting from stretching by a draw process to a ratio greater than 1:50, a multilayer unified polymer DEUC preform (Preform) having a size, a shape, and an arrangement of a plurality of matched polymer layers, the multilayer polymer thin film having DEUC structural features in at least one dimension proportionally reduced in comparison to the same DEUC structural features in the Preform; and where one or more layers of the multilayer polymer thin film comprise negative and positive electrodes made from conducting polymer and that are offset in a left/right orientation in a multilayer stack and are spaced apart by suspended particle high dielectric energy storage media, the matched polymer layers including the negative and positive electrodes made from conducting polymer and being spaced apart by the suspended particle high dielectric energy storage media, where one or more layers of the multilayer polymer thin film comprise suspended particle high dielectric energy storage media, and where the high dielectric energy storage media comprises high dielectric particles that are nano sized particles suspended in a binder, each particle surrounded with a protective coating preventing contact between the particle and the binder suspending the particle, the binder comprising at least one of a polymer, a copolymer, and a terpolymer.

7. The suspended particle DEUC thin film of claim 6, wherein the dielectric particles comprise at least one of:
a unique version of calcium copper titanate oxide where common calcium copper titanate oxide ($CaCu_3Ti_4O_{12}$) also referred to as CCTO is modified to form the unique CCTO-X ($Ca_xCux_xTi_xO_x$); with variations in the amounts of copper Ca, Cu and/or Ti content, and
where CCTO-X is doped with one or more materials including but not limited to at least one of zinc, silver, aluminum, strontium and lanthanum, and
where CCTO-X particles are surfaced modified to have an electrically insulating shell surrounding the CCTO-X particle.

8. The suspended particle DEUC thin film of claim 6, wherein the dielectric particles comprise at least one of:
LSNO (La15/8Sr1/8NiO4) particles; which are applied in a uniform distribution suspended in a polymer binder to form a suspended particle high dielectric energy storage media that is positioned between the electrodes; and
titanium phenyl phosphate particles which are applied in a uniform distribution suspended in a polymer binder to form a suspended particle high dielectric energy storage media that is positioned between the electrodes.

9. The suspended particle DEUC thin film of claim 6, wherein the binder comprises at least one of:
a polyvinylidene fluoride and/or polyvinylidene difluoride individually and collectively referred to as PVDF polymer; and
a polymer mixture of PVDF polymer and one or more low dielectric loss polymers comprising at least one of copolymers P(vdf-ctfe) and or P(vdfr-trfe-tfe) to reduce dielectric loss of the binder.

10. The suspended particle DEUC thin film of claim 6, wherein at least a portion of the multilayer polymer thin film comprises a thin film ribbon, and wherein at least one of:
at least a portion of the thin film ribbon forming a DEUC ultracapacitor;
multiple portions of the thin film ribbon being stacked together to form a DEUC ultracapacitor;
a portion of the thin film ribbon being wound into a cylinder forming a DEUC ultracapacitor having many layers; and
a portion of the thin film ribbon being wound into a cylinder forming a DEUC ultracapacitor in which the cylinder is further formed into any one of a plurality of various shapes.

11. A method of fabrication of a suspended particle Dense Energy Ultracapacitor DEUC module, comprising:
receiving a multilayer and unified polymer DEUC preform (Preform) having a size, a shape, and an arrangement of a plurality of matched and unified polymer layers, the matched polymer layers having at least thermal characteristics matching for all the matched polymer layers, the Preform suitable for stretching by a draw process into a multilayer polymer thin film, the Preform including DEUC structural features that are in at least one dimension proportionally larger in comparison to the same DEUC structural features in the multilayer unified polymer thin film, and where one or more layers of the Preform comprise negative and positive electrodes made from conducting polymer and that are spaced apart by suspended particle high dielectric energy storage media and offset in a left/right orientation in a multilayer stack, the matched polymer layers including the negative and positive electrodes made from conducting polymer and being spaced apart by the suspended particle high dielectric energy storage media, and where one or more layers of the Preform comprise suspended particle high dielectric energy storage media, and where the high dielectric energy storage media comprises high dielectric particles that are nano sized particles suspended in a binder, each particle surrounded with a protective coating preventing contact between the particle and the binder suspending the particle, the binder comprising at least one of a polymer, a copolymer, and a terpolymer, and where all of the Preform layers are bound together to form a unified Preform; and
stretching by a draw process the multilayer unified Preform to a ratio greater than 1:50 thereby forming a multilayer polymer thin film including DEUC structural features in at least one dimension proportionally reduced in comparison to the same DEUC structural features in the Preform.

12. The method of claim 11, wherein one or more layers of the multilayer polymer thin film are spaced apart to form a cooling tunnel, and where heat within the suspended particle DEUC module is transferred into the cooling tunnel and can be moved to and released through a thermal coupler or heat sink.

13. The method of claim 12, wherein the cooling tunnel is filled with dielectric fluid or air that acts as a heat transfer medium and can be connected to a heat sink.

14. The method of claim 11, wherein the DEUC module is designed and fabricated to store and provide electrical power to at least one of:
micro devices and integrated circuits,
electric vehicles,
unmanned aerial, terrestrial or water vehicles,
electronic cigarettes,
one or more of: mobile computing devices, laptops, tablets, mobile phones, wireless communication devices, and mobile sensor systems,
an electric power grid,
solar, wind, and other alternative energy systems support, and
one or more uninterruptible power supplies.

15. The method of claim 11, where the DEUC module is coupled with at least one of:

one or more solar cells;
one or more radioisotope power cells;
a photovoltaic system;
a thermalvoltaic system;
a movement charge system; and
a manual charge system; and
being designed and constructed for providing electric charge to the DEUC module and electric energy storage by the DEUC module.

16. The method of claim 11, wherein at least a portion of the multilayer polymer thin film comprises a thin film ribbon, and wherein at least one of:
at least a portion of the thin film ribbon is formed into a DEUC ultracapacitor;
multiple portions of the thin film ribbon are stacked together to form a DEUC ultracapacitor;
a portion of the thin film ribbon is wound into a cylinder forming a DEUC ultracapacitor having many layers; and
a portion of the thin film ribbon is wound into a cylinder forming a DEUC ultracapacitor in which the cylinder is further formed into any one of a plurality of various shapes.

17. A suspended particle dense energy ultracapacitor (DEUC) module that provides rapid charge and energy storage, the DEUC module comprising:
a. a silicone, rubber or polymer sheet loaded with high dielectric particles formed through extrusion and/or spray deposition to form an energy storage media layer comprising high dielectric particles which are surface modified by surrounding each particle with a protective coating that prevents contact between the particle and a polymer binder suspending the particle;
b. where conductive material is applied on both sides of the energy storage media layer to form positive and negative conducting polymer electrode layers;
c. where the positive conducting polymer electrode layers (positive electrodes) and the negative conducting polymer electrode layers (negative electrodes) are offset relative one another to separate them in a left/right orientation in a multilayer stack; and
d. a multilayer thin film comprising a plurality of matched polymer layers including at least the energy storage media layer, a positive conducting polymer electrode layer, and a negative conducting polymer electrode layer, where the matched polymer layers having at least thermal characteristics matching for all the matched polymer layers, the matched polymer layers having DEUC structural features formed from a multilayer unified DEUC preform (Preform) having a size, a shape, and an arrangement of a plurality of matched polymer layers, where the unified DEUC preform is stretched to a ratio greater than 1:50 to reduce all of the layers in one process to form a multilayer thin film having DEUC structural features in at least one dimension proportionally reduced in comparison to the same DEUC structural features in the Preform, the multilayer thin film applied as at least one of:
a layered DEUC module; and
rolled up DEUC film forming a cylindrical DEUC module; and
e. positive electrodes being interconnected to form a positive connector of the DEUC module; and
f. negative electrodes being interconnected to form a negative connector of the DEUC module; and
g. where the high dielectric particles comprise at least one of:
a proprietary version of calcium copper titanate oxide where common calcium copper titanate oxide ($CaCu_3Ti_4O_{12}$) also referred to as CCTO is modified to form the proprietary version of CCTO-X ($Ca_x Cu_x Ti_x O_x$);
the proprietary version of calcium copper titanate oxide (CCTO-X) having variations in copper Ca, Cu and/or Ti content;
the CCTO-X being doped with one or more materials comprising at least one of zinc, silver, aluminum, strontium and Lanthanum;
the CCTO-X particles being surface modified to have an electrically insulating shell surrounding each CCTO-X particle; and
the high dielectric particles comprising at least one of:
LSNO (La15/8Sr1/8NiO4) particles, which are applied in a uniform distribution suspended in a polymer binder to form a suspended particle high dielectric energy storage media that is positioned between the electrodes; and
titanium phenyl phosphate particles which are applied in a uniform distribution suspended in a polymer binder to form a suspended particle high dielectric energy storage media that is positioned between the electrodes.

* * * * *